United States Patent
Yang et al.

(10) Patent No.: US 12,127,281 B2
(45) Date of Patent: Oct. 22, 2024

(54) METHOD FOR MANAGING LINK CONNECTION BETWEEN NODES, AND RELATED DEVICE

(71) Applicant: ZTE CORPORATION, Guangdong (CN)

(72) Inventors: Li Yang, Guangdong (CN); He Huang, Guangdong (CN); Jianwu Dou, Guangdong (CN); Xiaojuan Shi, Guangdong (CN); Yuan Gao, Guangdong (CN)

(73) Assignees: Beijing Baidu Science Technology Co., Ltd., Beijing (CN); BAIDU USA LLC, Sunnyvale, CA (US)

( * ) Notice: Subject to any disclaimer, the term of this patent is extended or adjusted under 35 U.S.C. 154(b) by 397 days.

(21) Appl. No.: 17/279,627

(22) PCT Filed: Aug. 19, 2019

(86) PCT No.: PCT/CN2019/101316
§ 371 (c)(1),
(2) Date: Mar. 25, 2021

(87) PCT Pub. No.: WO2020/063192
PCT Pub. Date: Apr. 2, 2020

(65) Prior Publication Data
US 2021/0392710 A1  Dec. 16, 2021

(30) Foreign Application Priority Data
Sep. 28, 2018 (CN) .......................... 201811142058.4

(51) Int. Cl.
*H04W 76/15* (2018.01)
*H04W 36/08* (2009.01)
*H04W 76/34* (2018.01)

(52) U.S. Cl.
CPC ......... *H04W 76/15* (2018.02); *H04W 36/083* (2023.05); *H04W 76/34* (2018.02)

(58) Field of Classification Search
CPC ..... H04W 76/15; H04W 76/34; H04W 76/14; H04W 76/19; H04W 76/20; H04W 76/22;
(Continued)

(56) References Cited

U.S. PATENT DOCUMENTS

2003/0235165 A1  12/2003  Wang
2004/0077341 A1*  4/2004  Chandranmenon ... H04L 69/162
                                                            455/418
(Continued)

FOREIGN PATENT DOCUMENTS

CN  103733683 A  4/2014
CN  107295065 A  10/2017
(Continued)

OTHER PUBLICATIONS

International Search Report and Written Opinion for the International Patent Application No. PCT/CN2019/101316, mailed Nov. 21, 2019, 2 pages.
(Continued)

*Primary Examiner* — Sudesh M Patidar
(74) *Attorney, Agent, or Firm* — KDW Firm PLLC

(57) ABSTRACT

Provided are a method for managing a link connection between nodes and related devices. The method includes: a first mobile node setting up link connections with a plurality of peer network nodes separately through a network interface setup process; wherein setting up the link connections with the plurality of peer network nodes separately through the network interface setup process includes: the first mobile node dividing a plurality of local serving cells subordinate to the first mobile node into a plurality of local cell sets; and the first mobile node initiating setup processes of link connec-
(Continued)

tions with at least two of the plurality of peer network nodes over respective network interfaces of each local cell set of the plurality of local cell sets, and exchanging configuration information with the at least two of the plurality of peer network nodes mutually.

18 Claims, 9 Drawing Sheets

(58) Field of Classification Search
CPC ... H04W 76/23; H04W 76/27; H04W 84/005; H04W 36/08; H04W 36/0064; H04W 36/0077; H04W 36/037; H04W 36/083; H04W 88/085; H04W 72/29
See application file for complete search history.

(56) References Cited

U.S. PATENT DOCUMENTS

| | | | |
|---|---|---|---|
| 2013/0183971 A1 | 7/2013 | Tamaki et al. | |
| 2015/0156708 A1* | 6/2015 | Tietz | H04W 64/00 455/434 |
| 2017/0126307 A1* | 5/2017 | Wyler | H04W 72/0453 |
| 2018/0020419 A1* | 1/2018 | Mochizuki | H04W 60/04 |
| 2018/0279397 A1* | 9/2018 | Faccin | H04W 76/11 |
| 2019/0394696 A1* | 12/2019 | Mochizuki | H04W 76/15 |
| 2020/0015132 A1* | 1/2020 | Liu | H04W 36/385 |
| 2020/0037217 A1* | 1/2020 | Shapiro | H04W 36/08 |
| 2021/0067945 A1* | 3/2021 | Liu | H04W 76/10 |
| 2021/0204341 A1* | 7/2021 | Liu | H04W 24/02 |

FOREIGN PATENT DOCUMENTS

| | | | |
|---|---|---|---|
| CN | 107707292 A | 2/2018 | |
| CN | 108337663 A | 7/2018 | |
| CN | 108574969 A | 9/2018 | |
| WO | 2007004586 A1 | 1/2007 | |
| WO | 2011050840 A1 | 5/2011 | |
| WO | 2013070244 A1 | 5/2013 | |
| WO | WO-2019013543 A1 * | 1/2019 | ........ H04W 72/0426 |
| WO | WO-2019039987 A1 * | 2/2019 | |

OTHER PUBLICATIONS

First Official Action dated Jul. 21, 2022 for Chinese Patent Application No. 20181142058.4 (10 pages).
First Search Report dated Jul. 11, 2022 for Chinese Patent Application No. 20181142058.4 (six (6) pages).
Supplementary European Search Report dated Jul. 6, 2022 for Application No. EP19864859.4 (seven (7) pages).

* cited by examiner

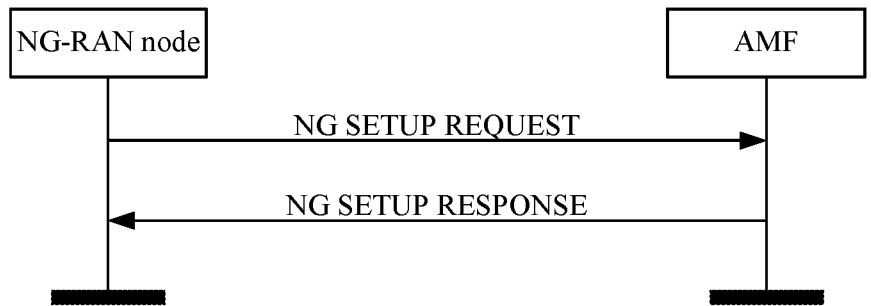
FIG. 3
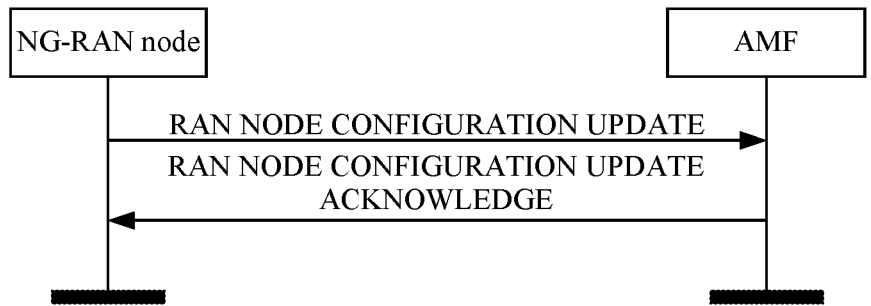
FIG. 4
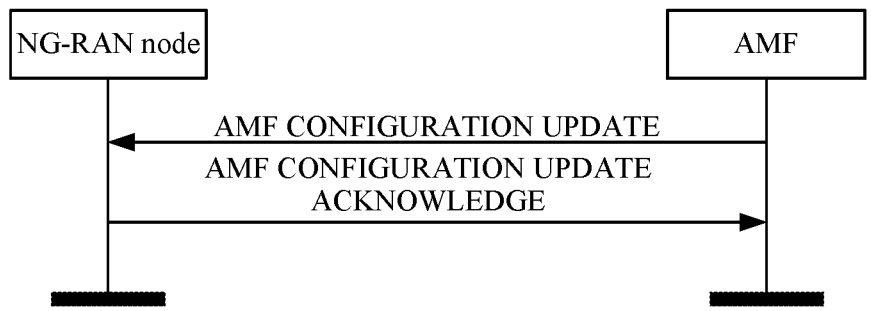
FIG. 5
| A first mobile node sets up link connections with multiple peer network nodes separately through a network interface setup process | ⟵ 601 |
FIG. 6

METHOD FOR MANAGING LINK CONNECTION BETWEEN NODES, AND RELATED DEVICE

CROSS-REFERENCE TO RELATED APPLICATIONS

This is a National Stage Application, filed under 35 U.S.C. 371, of International Patent Application No. PCT/CN2019/101316, filed on Aug. 19, 2019, which claims priority to Chinese Patent Application No. 201811142058.4 filed with the CNIPA on Sep. 28, 2018, the disclosures of which are incorporated herein by reference in their entireties.

TECHNICAL FIELD

Embodiments of the present application relate to, but are not limited to, mobile communication system technologies, for example, a method for managing a link connection between nodes and a related device.

BACKGROUND

In a traditional land-based cellular mobile network, each type of next generation radio access network (NG-RAN) base stations is deployed relatively static and fixed with respect to a physical location of a specific latitude and longitude on the ground. Therefore, the radio coverage/capacity supplies of air interface serving cells provided by NG-RAN base stations and the related interfaces, such as NG, Xn, and F1, connecting these NG-RAN base stations are also fixed with respect to the physical location. Transport network layer (TNL) transmission bears over the interfaces such as NG, Xn, and F1 are mostly implemented by using fixed-network modes such as broadband optical fibers. Therefore, the link transmission robustness and delay performance are relatively good. Such fixed land-based cellular mobile network is more convenient for operators to deploy and manage resources since all network element nodes and network resources can be planned and managed in a (semi-)static manner. In the fixed land-based cellular mobile network, as a user equipment (UE) moves, merely the link mobility of the UE between different serving cells/base stations/network element nodes needs to be solved in order to keep the continuity of user services.

In recent years, various types of mobile base stations have emerged, for example, vehicle-mounted mobile base stations on the ground, air unmanned aerial vehicle base stations and space satellite communication base stations. The radio coverage/capacity supplies of the air interface serving cells provided by these mobile base stations usually vary with the movement of physical locations of the mobile base stations. The TNL transmission bearers over NG, Xn and F1 interfaces connecting these mobile base stations cannot be in a fixed manner. The bearers cannot be implemented by using fixed-network modes such as broadband optical fibers and usually relies on multiple radio bear manners, such as microwave, laser and relay. Although such network constructed by the mobile base stations is more flexible in deployment, network resources and TNL radio bearers can only be planned and managed in a relatively dynamic manner. Otherwise, as multiple base stations move, the network topology varies, the quality of the TNL radio bearers is unstable, and each interface related to the mobile base stations is likely to be destroyed due to the variation and interruption of the TNL radio bearers. Thus, various kinds of resources on the mobile base station side cannot be efficiently utilized, and even services of the UE are forced to be interrupted, etc. In addition, as the mobile base stations move, configuration related to each other, such as radio coverage information, needs to be updated synchronously in time between related network element nodes to ensure smooth end-to-end radio links. Moreover, in the network constructed by the mobile base stations, a radio network layer (RNL) (above the TNL) application layer protocol connection, such as a next generation (NG) application protocol (NGAP) connection, an Xn application protocol (XnAP) connection and an F1 application protocol (F1AP) connection, also varies and is interrupted correspondingly with the variation and interruption of the TNL transmission bearers. Therefore, a mobile base station, when physically moving, frequently initiates processes such as setup and configuration Update processes to a new (old) peer network element node and continuously and repeatedly performs operations such as link setup, link disassembly, link reestablishment and configuration update of an RNL application protocol layer connection instance; this causes significant interruptions in RNL layer signaling and interface services.

SUMMARY

The present application provides a method for managing a link connection between nodes. The method includes that a first mobile node sets up link connections with multiple peer network nodes separately through a network interface setup process.

The present application further provides a first mobile node including a setup unit.

The setup unit is configured to set up link connections with multiple peer network nodes separately through a network interface setup process.

The present application further provides a system for managing a link connection between nodes. The system includes a first mobile node and multiple peer network nodes.

The first mobile node is configured to perform the preceding method for managing the link connection between nodes.

The present application further provides a first mobile node. The first mobile node includes a memory, a processor and a computer program stored in the memory and executable on the processor. When the computer program is executed by the processor, the preceding method for managing the link connection between nodes is performed.

The present application further provides a computer-readable storage medium storing an information processing program. When the information processing program is executed by a processor, the preceding method for managing the link connection between nodes is performed.

BRIEF DESCRIPTION OF DRAWINGS

The drawings are provided for a further understanding of the technical schemes of the present application and constitute a part of the description. The drawings and the embodiments of the present application are used to explain the technical schemes of the present application and not intended to limit the technical schemes of the present application.

FIG. 3 is a flowchart of an NG interface setup process between a traditional NG-RAN base station and an AMF;

FIG. 4 is an NG interface configuration update process between a traditional NG-RAN base station and an AMF and initiated on an NG-RAN side;

FIG. 5 is an NG interface configuration update process between a traditional NG-RAN base station and an AMF and initiated on an AMF side;

FIG. 6 is a flowchart of a method for managing a link connection between nodes according to an embodiment one of the present application;

DETAILED DESCRIPTION

The embodiments of the present application are described hereinafter in detail with reference to the drawings.

The steps illustrated in the flowcharts among the drawings may be performed by, for example, a computer system capable of executing a group of computer-executable instructions.

The fourth-generation (4G) or long term evolution (LTE) land-based cellular mobile communication system includes two subsystems: a 4G core network also referred to as evolved packet core (EPC) and a radio access network (RAN). The 4G EPC includes basic network element nodes such as a mobility management entity (MME) node, a serving gateway (SGW) node and a packet data network (PDN) gateway (PGW) node, while the 4G RAN includes a long term evolution base station, evolved node B (eNB), and related interfaces between the base station and network elements. A fifth-generation (5G) land-based cellular mobile communication system succeeding 4G also includes two subsystems: a fifth-generation core (5GC) and a next generation radio access network (NG-RAN). The 5GC includes an access mobility function (AMF) node, a session management function (SMF) node, a user plane function (UPF) node and other network element nodes, while the NG-RAN includes base stations of at least two different types of radio access technologies (RATs): an ng-eNB evolved based on a 4G eNB (with the evolved universal terrestrial radio access (E-UTRA) RAT still being supported over an air interface) and a gNB designed with a brand new physical layer air interface (with a new radio RAT being supported over an air interface). The NG-RAN also includes related interfaces of base stations and network elements.

Figure 1:
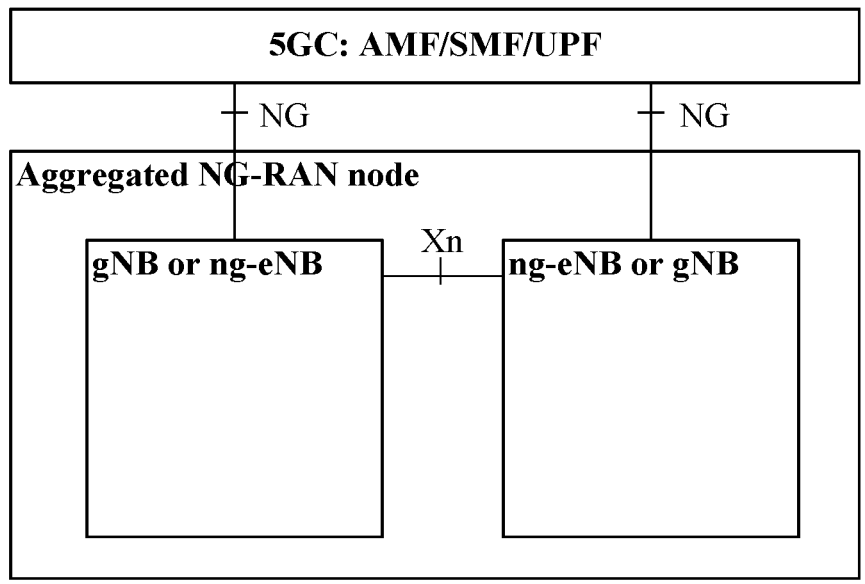
FIG. 1 is an architecture diagram of an aggregated NG-RAN base station that is not disaggregated into CU and DU air interface protocol stacks.
Figure 2:
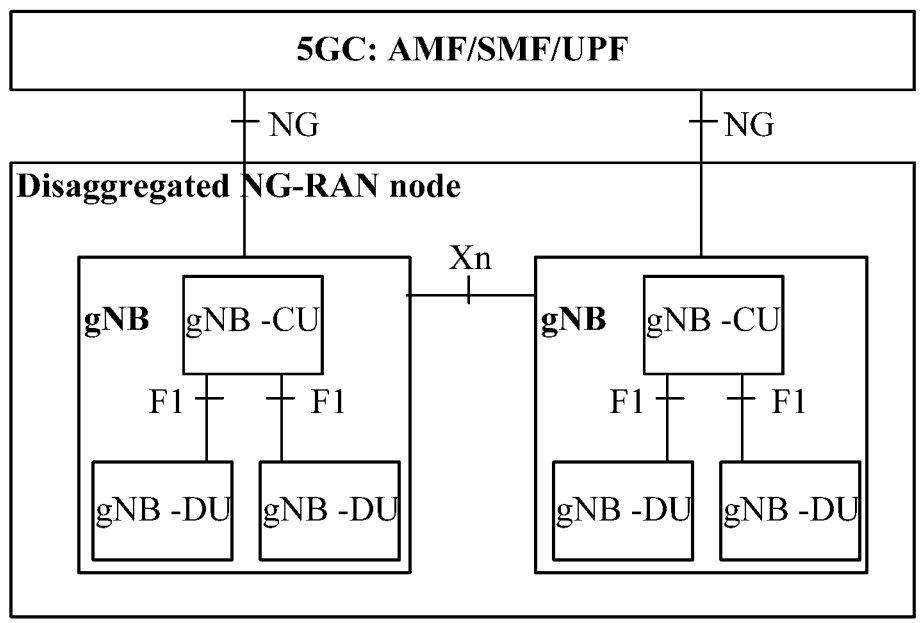
FIG. 2 is an architecture diagram of a disaggregated NG-RAN base station that is disaggregated into gNB CU and gNB DU air interface protocol stacks.

FIG. 1 is an architecture diagram of an aggregated base station (such as an aggregated NG-RAN base station) in which centralized unit (CU) and distributed unit (DU) air interface protocol stacks are not disaggregated. As shown in FIG. 1, the NG-RAN base station (gNB or ng-eNB) is connected to the 5GC over a standardized NG interface. A connection mode between the NG-RAN base station and the 5GC includes a next generation-control plane (NG-C, 5G core network element control plane connection) control plane (signaling) connection and a next generation-user plane (NG-U, 5G core network element user plane connection) user plane (user data) connection. NG-RAN base stations (gNBs or ng-eNBs) are connected to each other over an Xn interface. The connection mode between the NG-RAN base stations includes an Xn-control plane (Xn-C, control plane connection between NG-RAN base stations) control plane connection and an Xn-user plane (Xn-U, user plane connection between NG-RAN base stations) user plane connection. FIG. 2 is an architecture diagram of a disaggregated base station gNB (such as a disaggregated NG-RAN base station) in which CU and DU air interface protocol stacks are disaggregated. FIG. 2 is illustrated by using a currently supported example in which the gNB is disaggregated, a single gNB is disaggregated into a single gNB-CU and multiple gNB-DU network element node entities, and the gNB-CU is connected to the gNB-DUs over standardized F1 interfaces. A connection mode based on the F1 interface includes an F1-C control plane connection and an F1-U user plane connection. The gNB after the CU/DU disaggregation and the gNB without the disaggregation are each connected to outside over NG and Xn interfaces. The control plane (CP) connections of the preceding various types of interfaces are configured for transmitting control signaling messages between network element nodes, while the user planes (UP) connections of the various types of interfaces are configured for transmitting user service data (packets). The NGAP, XnAP, and F1AP are application layer protocols for next generation-control plane (NG-C, 5G core network element control plane connections), Xn-control plane (Xn-C, control plane connections among NG-RAN base stations) and F1-C control plane radio network layer (RNL), respectively. The preceding application layer protocols are used for transmitting control signaling of corresponding interfaces based on transport network layer (TNL) transmission bearers (streaming control transport protocol (SCTP) connection). The next generation-user plane (NG-U, 5G core network element user plane connection), Xn-user plane (Xn-U, user plane connection between NG-RAN base stations) and F1-U user plane interface user data frames are used for transmitting user data of corresponding interfaces based on TNL transmission bearers (general packet radio service (GPRS) tunnel protocol (GTP-U) tunnel).

To simplify the description, the NG interface is used as an example. The principles of Xn and F1 interfaces are basically similar. According to current third-generation partnership project (3GPP) protocols, a single NG-RAN base station and an internal local serving cell thereof generally need to be connected to a unique peer AMF entity merely over a single NG-C interface NGAP from the perspective of actual deployment and use, and the unique peer AMF entity is referred to as the serving AMF of the base station/serving cell. As shown in FIG. 3, an NG setup process of the NG interface enables an NG-RAN base station to actively initiate an NGAP connection setup with the peer serving AMF and to interact with the peer serving AMF about respective initial local configuration information, such as node-level and cell-level capability and configuration related information, and configuration and identification of a local serving cell/tracking area. As shown in FIG. 4, if any local configuration information of the NG-RAN base station is updated, the NG-RAN base station may initiate an NGAP configuration update with the serving AMF through an RAN configuration update process. As shown in FIG. 5, if any local configuration information of the AMF is updated, the AMF may initiate an NGAP configuration update with the NG-RAN base station through an AMF configuration update process. Due to the requirements of various deployment changes, if a single NG-RAN base station/serving cell needs to be connected to another new serving AMF, the NGAP connection and related port resources with the original old serving AMF are generally deleted first and the NG setup process is re-initiated to the new serving AMF. This "top-down tree topology" is sufficient for the traditional land-based cellular mobile network since specific local serving cell resources within a single NG-RAN base station generally need to merely be under the jurisdiction of a single serving AMF. Similarly, specific local serving cell resources within a single gNB-DU entity typically need to merely be under the jurisdiction of a single serving gNB-CU entity. Although the Xn interface is capable of supporting XnAP connections between a single NG-RAN base station/serving cell and multiple adjacent NG-RAN base stations/serving cells simultaneously, the XnAP connections also need to involve corresponding processes such as setup and configuration update processes.

In recent years, multiple types of mobile base stations have emerged. Thus, as the mobile base stations move, configuration related to each other, such as radio coverage information, needs to be updated synchronously in time between related network element nodes to ensure smooth end-to-end radio links. For example, in the network constructed by the mobile base stations, an RNL (above the TNL) application layer protocol connection, such as an NGAP connection, an XnAP connection or an F1AP connection, also varies and is interrupted correspondingly with the variation and interruption of the TNL transmission bearers. Therefore, a mobile base station, when physically moving, frequently initiates processes such as setup and configuration update processes to a new (old) peer network element node and continuously and repeatedly performs operations such as link setup, link disassembly, link reestablishment and configuration update of an RNL application protocol layer connection instance, which causes significant interruptions in RNL layer signaling and interface services.

Based on this, the present application provides a concept of multiple connections among network element entities (nodes), so that in the network environment constructed by the mobile base stations, the TNL transmission bearers and the upper layer RNL application protocol layer connection between a mobile network element node (serving cell) and a peer network element node can be efficiently set up and maintained. Thus, it is ensured as much as possible that the interfaces of the network, such as NG, F1 and Xn, can match and adapt to the dynamic topology change of the mobile base stations in time, the unnecessary TNL/RNL layer interface reconstruction and interface service interruption of the interfaces such as NG, F1 and Xn is minimized, and the utilization rate of resources of the mobile base stations by the system is improved.

Embodiment One

FIG. 6 is a flowchart of a method for managing a link connection between nodes according to embodiment one of the present application. As shown in FIG. 6, the method includes the step described below.

In step 601, a first mobile node sets up link connections with multiple peer network nodes separately through a network interface setup process.

In an embodiment, the link connections include at least one of: control plane signaling connections or user plane data connections.

In an embodiment, the link connections may include the control plane signaling connections (configured for transmitting control signaling messages and the like) and the user plane data connections (configured for transmitting service data packets and the like).

In an embodiment, the step in which the first mobile node sets up link connections with the multiple peer network nodes separately through the network interface setup process includes steps described below.

The first mobile node divides multiple local serving cells subordinate to the first mobile node into multiple local cell sets.

Each local cell set initiates, over a corresponding network interface, setup processes of link connections with at least two of the multiple peer network nodes and interacts with the at least two of the multiple peer network nodes about respective configuration information.

In an embodiment, cells in the same local cell set have the same management attribute, and different local cell sets have different management attributes.

In an embodiment, the configuration information includes at least one of: a local capability of a local cell set, resource configuration of a local cell set or radio coverage related information of a local cell set.

In this embodiment, the configuration information includes information such as the local capability, resource configuration and radio coverage related information of the local cell (set).

In this embodiment, after the interaction about the respective configuration information, the method further includes a step described below.

Different local cell sets among the multiple local cell sets are under jurisdictions of different peer network nodes.

Alternatively, the same local cell set among the multiple local cell sets is under the jurisdiction of different peer network nodes simultaneously.

In this embodiment, different local cell sets of the first mobile node may be respectively under the jurisdictions of different peer network nodes, or the same local cell set of the first mobile node may be under the jurisdiction of different peer network nodes simultaneously.

In an embodiment, after the first mobile node sets up a first link connection with a first peer network node, the method further includes steps described below.

In a case where all local cell sets subordinate to the first mobile node are completely within a second coverage tracking area range under the jurisdiction of a second peer network node among the multiple peer network nodes, a second link connection between the first mobile node and the second peer network node is in an activated state, other link connections between the first mobile node and other peer network nodes among the multiple peer network nodes except the second peer network node are in a deactivated state, and the first mobile node is under the jurisdiction of the second peer network node.

In an embodiment, after the first mobile node is under the jurisdiction of the second peer network node, the method further includes steps described below.

In a case where at least one local cell set subordinate to the first mobile node is within a first coverage tracking area range under the jurisdiction of the first peer network node among the multiple peer network nodes, the first link connection that has been set up between the first mobile node and the first peer network node is activated, at this time, the first mobile node and the at least one local cell set subordinate to the first mobile node are under the concurrent jurisdiction of the second peer network node and the first peer network node simultaneously.

In an embodiment, the step of activating the first link connection that has been set up between the first mobile node and the first peer network node includes steps described below.

The first mobile node initiates a transport network layer (TNL) link association, initiates a node configuration update process to the first peer network node, and notifies, through the first link connection that has been set up with the first peer network node, the first peer network node that the at least one local cell set is within the first coverage tracking area range and of information about the at least one local cell set subordinate to the first mobile node. In this embodiment, the information about the at least one local cell set subordinate to the first mobile node may refer to identification information about all or part of the local cell sets subordinate to the first mobile node which are within the first coverage tracking area range. For example, the identification information may be an ID of a cell or an ID of a cell set.

In an embodiment, the method further includes steps described below.

The first mobile node initiates a node configuration update process to the second peer network node and notifies, through the second link connection that has been set up with the second peer network node, the second peer network node that the at least one local cell set is out of the second coverage tracking area range and of information about local cell sets subordinate to the first mobile node except the at least one local cell set. In this embodiment, the information about the local cell sets subordinate to the first mobile node except the at least one local cell set may be identification information about all or part of the local cell sets subordinate to the first mobile node that are still within the second coverage tracking area range. For example, the identification information may be an ID of a cell or an ID of a cell set.

In an embodiment, after the first mobile node is under the concurrent jurisdiction of the second peer network node and the first peer network node simultaneously, the method further includes steps described below.

In a case where all local cell sets subordinate to the first mobile node are out of the second coverage tracking area range, the TNL link association is temporarily turned off, thus the second link connection is deactivated, the first mobile node and all local cell sets subordinate to the first mobile node are merely under the jurisdiction of the first peer network node.

In an embodiment, the step of deactivating the second link connection includes steps described below.

The first mobile node initiates a node configuration update process to the second peer network node and notifies, through the second link connection that has been set up with the second peer network node, the second peer network node that all local cell sets subordinate to the first mobile node are out of the second coverage tracking area range, but the second peer network node still keeps configuration context information of an interface link connection for the first mobile node to subsequently initiate a TNL link association again.

In an embodiment, the method further includes steps described below.

In a case where a first user equipment (UE) triggers a mobile handover process for handover from a first local cell set subordinate to the first mobile node to a second local cell set subordinate to a second mobile node, and the first local cell set and the second local cell set are both within a first coverage tracking area range under a jurisdiction of a first peer network node among the multiple peer network nodes, merely UE access stratum (AS) context of the first UE is transferred from the first mobile node to the second mobile node, and UE non-access stratum (NAS) context is always kept and maintained in the first peer network node.

In an embodiment, the method further includes steps described below.

In a case where the first UE stays in the first coverage tracking area range under the jurisdiction of the first peer network node, the first peer network node always saves UE NAS context of the first UE; and only when the first UE moves outside the first coverage tracking area range under the jurisdiction of the first peer network node, a target peer network node saves the migrated UE NAS context.

In this embodiment, when the first UE stays in the first coverage tracking area range under the jurisdiction of the first peer network node, the first peer network node always saves the UE NAS context; and only when the first UE moves outside the first coverage tracking area range under the jurisdiction of the first peer network node, the new target peer network node tries to save the migrated UE NAS context.

In an embodiment, the mobile node is a mobile NG-RAN base station, the peer network node is a 5GC network node, and the link connection is an NGAP connection instance.

Alternatively, the mobile node is a mobile NG-RAN base station, the peer network node is a mobile NG-RAN base station, and the link connection is an XnAP connection instance.

Alternatively, the mobile node is a distributed unit (DU), the peer network node is a centralized unit (CU), and the link connection is an F1AP connection instance.

In an embodiment, the 5GC network node is one of: an access mobility function (AMF) node, a session management function (SMF) node or a user plane function (UPF) node.

The mobile NG-RAN base station is one of: an ng-eNB evolved based on a 4G eNB, a gNB designed with a brand new physical layer air interface, a low earth orbit (LEO) satellite loaded with a full gNB function or an unmanned aerial vehicle base station loaded with a full gNB function.

A CU in the mobile NG-RAN base station is a gNB-CU of a disaggregated NG-RAN base station.

A DU in the mobile NG-RAN base station is one of: a gNB-DU of the disaggregated NG-RAN base station or an LEO satellite loaded with a gNB-DU function.

The technical scheme provided in the embodiment one is described below in detail through several embodiments.

Embodiment Two

Figure 7A:
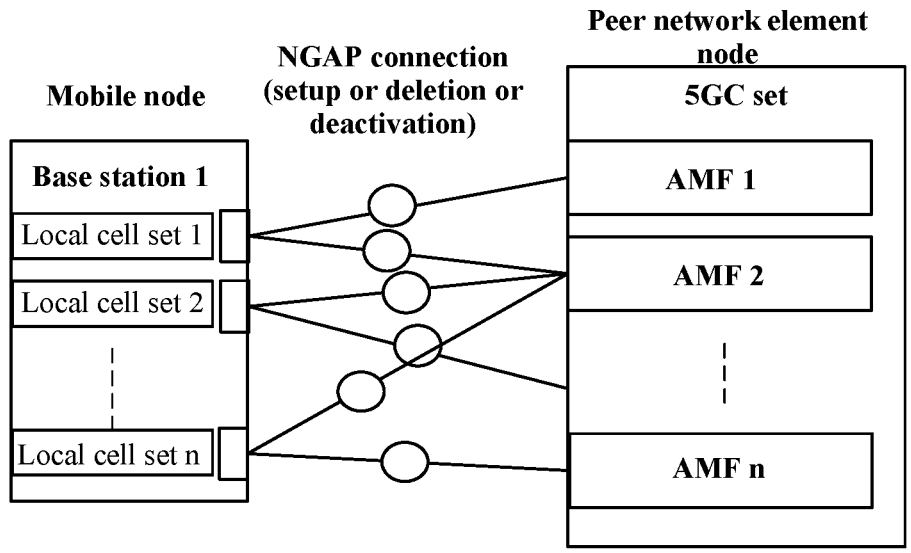
FIG. 7A is a schematic diagram of NG interface multiple connections among network nodes according to an embodiment two of the present application.
Figure 7B:
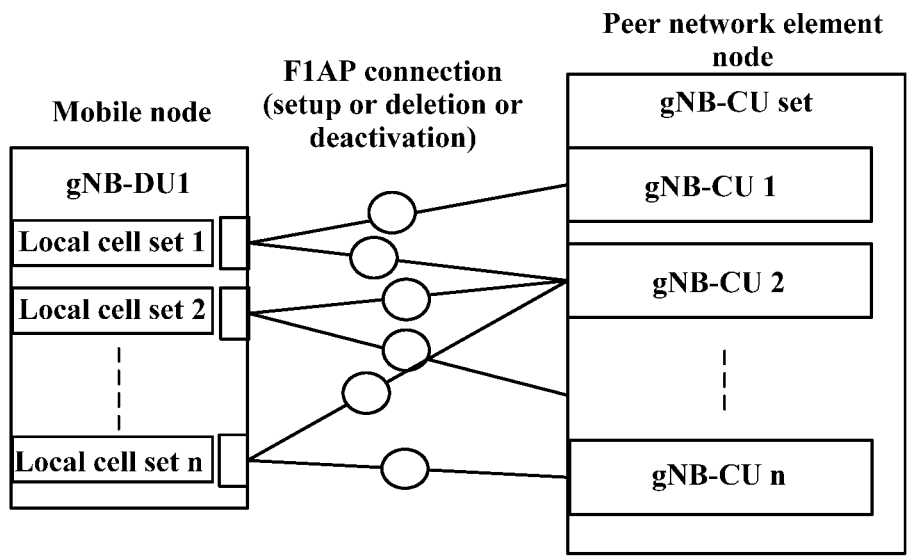
FIG. 7B is a schematic diagram of F1 interface multiple connections among network nodes according to the embodiment two of the present application.
Figure 7C:
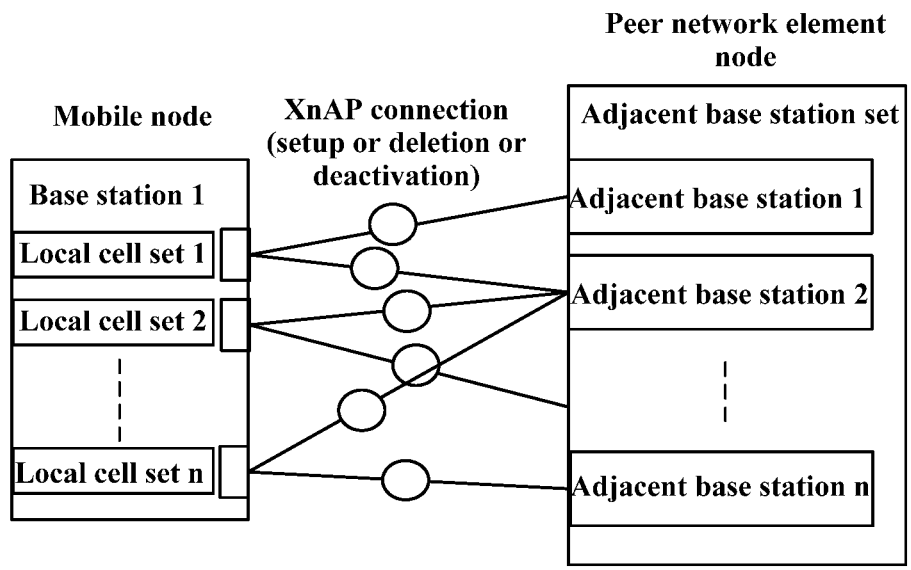
FIG. 7C is a schematic diagram of Xn interface multiple connections among network nodes according to the embodiment two of the present application.

FIG. 7A is a schematic diagram of NG interface multiple connections between network nodes according to the embodiment two of the present application; FIG. 7B is a schematic diagram of F1 interface multiple connections between network nodes according to the embodiment two of the present application; FIG. 7C is a schematic diagram of Xn interface multiple connections between network nodes according to the embodiment two of the present application.

As shown in FIG. 7A, a single NG-RAN base station 1 (mobile node) is on the left side and may be physically mobile, so the TNL transmission bearers and the upper layer RNL NGAP connections between the single NG-RAN base station 1 and other network element nodes are easy to change or be interrupted and destroyed. Multiple 5GC peer network element node sets are on the right side and are fixed or stationary on the ground by default. A 5GC peer network element node set is a peer object with which each mobile NG-RAN base station sets up a TNL transmission bearer and an upper layer NGAP connection.

Base station 1 divides all its internal local serving cells into multiple local cell sets 1, 2, . . . , n. In a special case, a local cell set is one local serving cell, that is, each local cell set includes merely one local serving cell.

Base station 1 may re-divide the local cell set to which a local serving cell belongs.

Base station 1 has a certain location function and may understand the relationship between base station 1 itself, the coverage of local serving cells and a planned ground coverage area.

Each local cell set may set up and keep different NGAP connections with multiple AMF nodes simultaneously and thus may be under the jurisdiction of multiple AMF nodes simultaneously.

Different local cell sets may independently set up and keep NGAP connections with different AMF entity sets.

As shown in FIG. 7A, a TNL transmission bearer and an upper layer NGAP connection are set up between the port corresponding to local cell set 1 and AMF1, and a TNL transmission bearer and an upper layer NGAP connection are set up between the port corresponding to local cell set 1 and AMF2. When configuration information of local cell set 1 or AMF1 or AMF2 changes, especially when the geographical location covered by a local serving cell changes, information about re-association with a different planned ground coverage area may be updated through processes such as an NG interface configuration update process. At the same time, a TNL transmission bearer and an upper layer NGAP connection are set up between the port corresponding to local cell set 2 and AMF2, and a TNL transmission bearer and an upper layer NGAP connection are set up between the port corresponding to local cell set 2 and AMFx. When configuration information of local cell set 2 or AMF2 or AMFx changes, an update may be performed through processes such as the NG interface configuration update process. Similarly, a TNL transmission bearer and an upper layer NGAP connection are set up between the port corresponding to local cell set n and AMF2, and a TNL transmission bearer and an upper layer NGAP connection are set up between the port corresponding to local cell set n and AMFn. When configuration information of local cell set n or AMF2 or AMFn changes, an update may be performed through processes such as the NG interface configuration update process.

Each NGAP connection has three real-time states: setup (activation), deletion and deactivation.

Setup (activation) refers to that an NGAP connection has been set up, is in a normal operation state, and is capable of transmitting NGAP process messages.

Deactivation refers to that although an NGAP connection has been set up, NGAP process messages cannot be transmitted temporarily and two peer nodes of the NGAP communication temporarily have saved and have not deleted the old NGAP connection configuration and corresponding port resources.

Deletion refers to that two peer nodes of the NGAP communication delete the old NGAP connection configuration and corresponding port resources.

Similarly, as shown in FIG. 7B, a single gNB-DU1 (mobile node) is on the left side and may be physically mobile, so the TNL transmission bearers and the upper layer RNL F1AP connections between the single gNB-DU1 and other network element nodes are easy to change or be interrupted and destroyed. Multiple gNB-CU peer network element node sets are on the right side and are fixed or stationary on the ground by default. A gNB-CU peer network element node set is a peer object with which each mobile gNB-DU sets up a TNL transmission bearer and an upper layer NGAP connection.

gNB-DU1 divides all its internal local serving cells into multiple local cell sets 1, 2, . . . , n. In a special case, a local cell set is one local serving cell, that is, each local cell set includes merely one local serving cell.

gNB-DU1 may re-divide the local cell set to which a local serving cell belongs.

gNB-DU1 has a certain location function and may understand the relationship between gNB-DU1 itself, the coverage of local serving cells and a planned ground coverage area.

Each local cell set may set up and keep different F1AP connections with multiple gNB-CU nodes simultaneously and thus may be under the jurisdiction of multiple gNB-CU nodes simultaneously.

Different local cell sets may independently set up and keep F1AP connections with different gNB-CU entity sets.

As shown in FIG. 7B, a TNL transmission bearer and an upper layer F1AP connection are set up between the port corresponding to local cell set 1 and gNB-CU1, and a TNL transmission bearer and an upper layer F1AP connection are set up between the port corresponding to local cell set 1 and gNB-CU2. When configuration information of local cell set 1 or gNB-CU1 or gNB-CU2 changes, especially when the geographical location covered by a local serving cell changes, information about re-association with a different planned ground coverage area may be updated through processes such as an F1 interface configuration update process. At the same time, a TNL transmission bearer and an upper layer F1AP connection are set up between the port corresponding to local cell set 2 and gNB-CU2, and a TNL transmission bearer and an upper layer F1AP connection are set up between the port corresponding to local cell set 2 and gNB-CUx. When configuration information of local cell set 2 or gNB-CU 2 or gNB-CUx changes, an update may be performed through processes such as the F1 interface configuration update process. Similarly, a TNL transmission bearer and an upper layer F1AP connection are set up between the port corresponding to local cell set n and gNB-CU2, and a TNL transmission bearer and an upper layer F1AP connection are set up between the port corresponding to local cell set n and gNB-CUn. When configuration information of local cell set n or gNB-CU 2 or gNB-CUn changes, an update may be performed through processes such as the F1 interface configuration update process.

Each F1AP connection has three real-time states: setup (activation), deletion and deactivation.

Setup (activation) refers to that an F1AP connection has been set up, is in a normal operation state, and is capable of transmitting F1AP process messages.

Deactivation refers to that although an F1AP connection has been set up, F1AP process messages cannot be transmitted temporarily and two peer nodes of the F1AP communication temporarily have saved and have not deleted the old F1AP connection configuration and corresponding port resources.

Deletion refers to that two peer nodes of the F1AP communication delete the old F1AP connection configuration and corresponding port resources.

Similarly, as shown in FIG. 7C, a single NG-RAN base station 1 (mobile node) is on the left side and may be physically mobile, so the TNL transmission bearers and the upper layer RNL XnAP connections between the single NG-RAN base station 1 and other network element nodes are easy to change or be interrupted and destroyed. A set of multiple adjacent base stations as peer network element nodes are on the right side and are fixed or stationary on the ground by default. An adjacent base station is a peer object with which each mobile NG-RAN base station sets up a TNL transmission bearer and an upper layer XnAP connection.

Base station 1 divides all its internal local serving cells into multiple local cell sets 1, 2, . . . , n. In a special case, a local cell set is one local serving cell, that is, each local cell set includes merely one local serving cell.

Base station 1 may re-divide the set to which a local serving cell belongs.

Base station 1 has a certain location function and may understand the relationship between base station 1 itself, the coverage of local serving cells and a planned ground coverage area.

Each local serving cell set may set up and keep different XnAP connections with multiple adjacent base station nodes simultaneously.

Different local serving cell sets may independently set up and keep XnAP connections with different adjacent base station entity sets and thus may be associated with multiple adjacent base station nodes simultaneously.

As shown in FIG. 7C, a TNL transmission bearer and an upper layer XnAP connection are set up between the port corresponding to local cell set 1 and adjacent base station 1, and a TNL transmission bearer and an upper layer XnAP connection are set up between the port corresponding to local cell set 1 and adjacent base station 2. When configuration information of local cell set 1 or adjacent base station 1 or adjacent base station 2 changes, especially when the geographical location covered by the local serving cell changes, information about re-association with a different planned ground coverage area may be updated through processes such as an Xn interface configuration update process. At the same time, a TNL transmission bearer and an upper layer XnAP connection are set up between the port corresponding to local cell set 2 and adjacent base station 2, and a TNL transmission bearer and an upper layer XnAP connection are set up between the port corresponding to local cell set 2 and adjacent base station x. When configuration information of local cell set 2 or adjacent base station 2 or adjacent base station x changes, an update may be performed through processes such as the Xn interface configuration update process. Similarly, a TNL transmission bearer and an upper layer XnAP connection are set up between the port corresponding to local cell set 2 and adjacent base station 2, and a TNL transmission bearer and an upper layer XnAP connection are set up between the port corresponding to local cell set 2 and adjacent base station x. When configuration information of local cell set 2 or adjacent base station 2 or adjacent base station x changes, an update may be performed through processes such as the Xn interface configuration update process.

Each XnAP connection has three real-time states: setup (activation), deletion and deactivation.

Setup (activation) refers to that an XnAP connection has been set up, is in a normal operation state, and is capable of transmitting XnAP process messages.

Deactivation refers to that although an XnAP connection has been set up, XnAP process messages cannot be transmitted temporarily and two peer nodes of the XnAP communication temporarily have saved and have not deleted the old XnAP connection configuration and corresponding port resources.

Deletion refers to that two peer nodes of the XnAP communication delete the old XnAP connection configuration and corresponding port resources.

Embodiment Three

In the embodiment three, the local cell set includes merely one cell, that is, one cell is a local cell set; the first mobile node is a mobile NG-RAN base station which is an LEO satellite loaded with the full gNB function; the peer network node is an access mobility function (AMF) node; and the link connection between the first mobile node and the peer network node is an NG interface connection.

Figure 8A:
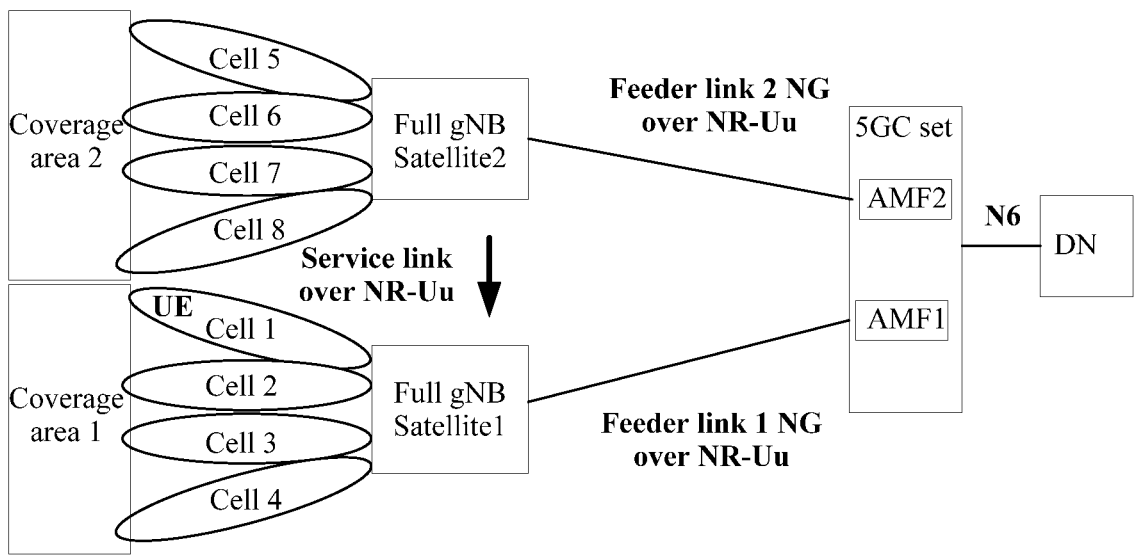
FIG. 8A is a schematic diagram of architecture of an FU-type satellite communication system according to an embodiment three of the present application.

FIG. 8A is a schematic diagram of architecture of a full unit (FU)-type satellite communication system according to the embodiment three of the present application. As shown in FIG. 8A, in the FU-type satellite communication system, multiple LEO satellites are loaded with the full gNB function and travel periodically around the earth in space along the same specific orbit. A terminal UE on the ground (assuming quasi-stationary on the ground and in a radio resource control (RRC)-connected state) is currently located in planned ground coverage area 1 under the jurisdiction of AMF1. The current serving cell of the UE is cell 1 under the jurisdiction of satellite 1. The UE directly performs radio communications with space FU-type satellite 1 through a service link, while the LEO satellites respectively set up NG connections with AMFs/SMFs/UPFs in the ground station 5GC set through feeder links. The NG connections include NG-C signaling NGAP connections and NG-U data connections.

Figure 8B:
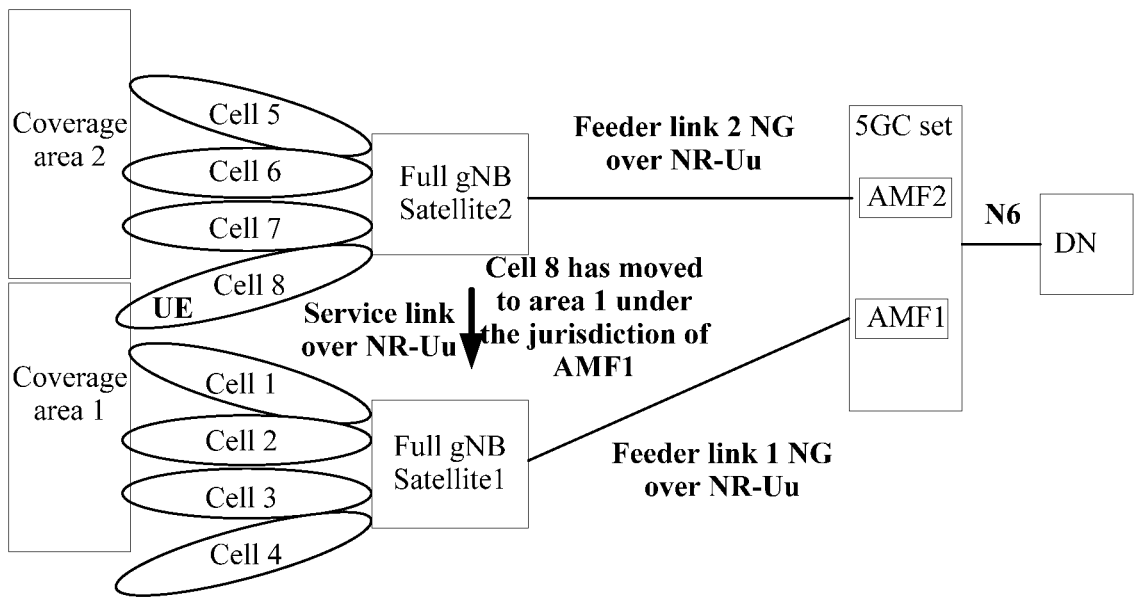
FIG. 8B is a schematic diagram in which an FU-type satellite moves across areas of different ground station AMFs according to an embodiment three of the present application.

Based on the traditional scheme of managing a connection between nodes, in FIG. 8A, satellite 1 is currently connected to ground station AMF1 and satellite 2 is connected to ground station AMF2 (note: in some spatial locations, satellites 1 and 2 may also be connected to the same AMF of the ground station). As the satellites continue to move downward along the specific orbit, multiple serving cells 8, 7, 6 and 5 under the jurisdiction of satellite 2 gradually leave planned ground coverage area 2 and move into planned ground coverage area 1. As shown in FIG. 8B, cell 8 has moved from the original old coverage area 2 into the new coverage area 1 under the jurisdiction of AMF1. Similarly, cell 4 of satellite 1 also moves out of the original old coverage area 1 accordingly. According to the requirements of radio link mobility management of a connected-state UE, when the UE monitors that the service signal of the old cell 1 is weaker and weaker, while the service signal of the new cell 8 is stronger and stronger, the UE triggers the network to execute a mobile handover process, and the network attempts to hand over the UE from the old serving cell 1 to the new serving cell 8. The result of successful handover is as follows: on an NG-RAN access network side, the UE AS context is transferred from satellite 1 to satellite 2, and on a 5GC core side, the UE NAS context is temporarily transferred from AMF1 to AMF2 (since satellite 2 is always under the jurisdiction of AMF2). After a period of time, when satellite 2 completely moves over the center of coverage area 1 (the current location of satellite 2 is similar to the location of satellite 1 in FIG. 8A), satellite 2 initiates an NG interface setup process to the new ground station AMF1 while deleting the NG interface with the old ground station AMF2, so that cells 5, 6, 7 and 8 under the jurisdiction of satellite 2 are used for covering coverage area 1. Due to AMF relocation from the anchor point core network element AMF2 to AMF1 of satellite 2, although satellite 2 may continue to retain the UE AS context at this time, the UE NAS context still needs to be retransferred from AMF2 back to AMF1, resulting in roundabout transfer between different ground station AMFs.

For this, a new scheme of managing a connection between nodes is provided in the embodiment three of the present application. The scheme includes steps described below.

Initially, each satellite, for example, satellite 2, sets up NGAP connections in advance respectively with multiple different ground station AMFs, AMF1 and AMF2, and synchronously interacts with the multiple different AMFs through NG setup processes about respective capability configuration information of the local serving cell and the like. The capability configuration information of the local serving cell includes information about an association between the current local serving cell coverage and different planned ground coverage areas. When satellite 2 is completely over the center of planned ground coverage area 2, cells 5, 6, 7 and 8 are all merely associated with coverage area 2 and thus are all under the jurisdiction of AMF2, so satellite 2 can merely keep the NGAP connection with the anchor point AMF2 activated, and the NGAP connection with AMF1 can be temporarily deactivated.

Figure 8C:
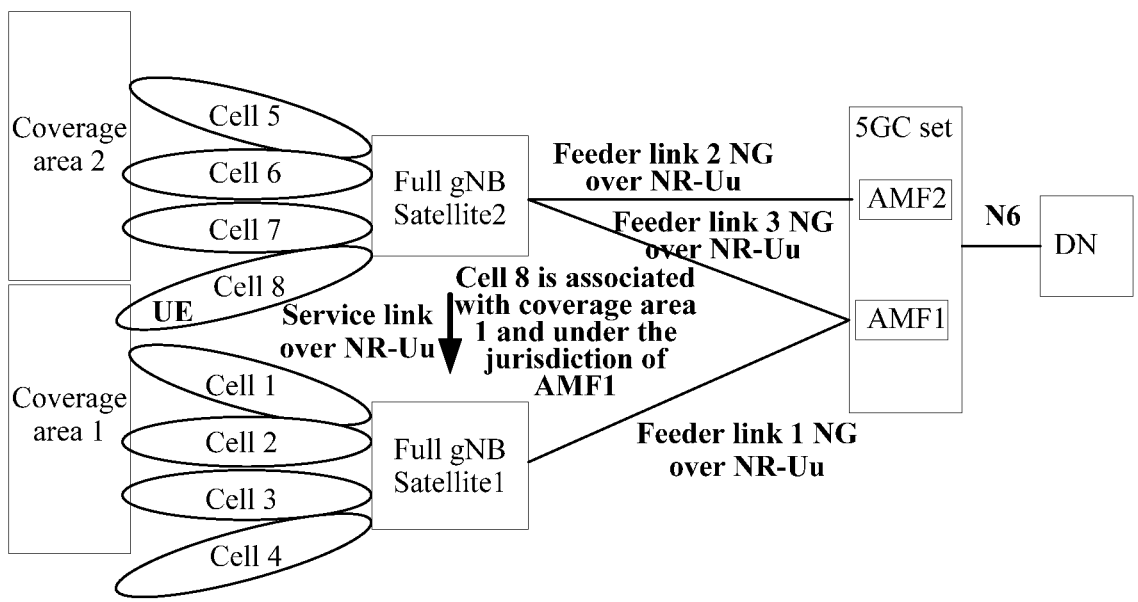
FIG. 8C is a schematic diagram of multiple connections between an FU-type satellite and multiple ground station AMFs according to the embodiment three of the present application.

As shown in FIG. 8C, when satellite 2 enters a boundary area across different ground station AMFs, the NGAP connection between satellite 2 and AMF1 may be reactivated. At this time, satellite 2 informs AMF2 through an RAN configuration update process that cell 8 has left coverage area 2 and the remaining cells 5, 6, and 7 are still in coverage area 2; meanwhile, satellite 2 also informs AMF1 through an RAN configuration update process that cell 8 has entered coverage area 1. Similarly, satellite 1 informs AMF1 through an RAN configuration update process that cell 4 has left coverage area 1 and the remaining cells 1, 2 and 3 are still in coverage area 1. Through the above process, AMF1 can know that cell 8 has entered the coverage area 1 under the jurisdiction of AMF1 itself and can be under the jurisdiction of AMF1 itself. Therefore, when the UE triggers a mobile handover process in the old serving cell 1, merely the UE AS context needs to be transferred from satellite 1 to satellite 2 on the NG-RAN access network side. However, on the 5GC core side, the UE NAS context does not need to be transferred from AMF1 to AMF2, that is, the UE NAS context continues to be kept in AMF1.

In addition, since cell 8 leaves coverage area 2 and enters coverage area 1, which is a continuous and gradual process, a period of transition time exists during which cell 8 spans both coverage area 2 and coverage area 1. Therefore, cell 8 may also be associated with two coverage areas 1 and 2 simultaneously and may be under the concurrent jurisdiction of and used by AMF1 and AMF2 simultaneously.

As satellite 2 continues to move downward along the orbit, cells 7, 6 and 5 gradually leave coverage area 2 and enter coverage area 1, and satellite 2 continues to inform AMF2 through the RAN configuration update process of the information about a re-association between a latest local serving cell and coverage area 2; at the same time, satellite 1 continues to inform AMF1 through the RAN configuration update process of the information about a re-association between a latest local serving cell and coverage area 1. Therefore, even when the UE triggers the mobile handover process again in the old serving cell, the UE AS context can always be saved in satellite 2 on the NG-RAN access network side, and the UE NAS context can always be kept in AMF1 on the 5GC core side.

Thus, as long as the UE is stationary in coverage area 1 under the jurisdiction of AMF1, although the UE AS context is transferred between different serving satellites due to the handover of serving cells, the UE NAS context can always be kept in AMF1, thus avoiding the relocation detour of the AMF anchor point caused by the continuous handover of serving satellites.

As shown in FIG. 8C, as satellite 2 continues to move downward along the orbit, the uppermost cell 5 also leaves coverage area 2 and enters coverage area 1. At this time, satellite 2 is basically over the center of coverage area 1, and cells 5, 6, 7 and 8 are all associated merely with coverage area 1 and thus may all be under the jurisdiction of AMF1. At this time, satellite 2 may also initiate the deactivation of the NGAP connection to AMF2 through the RAN configuration update process, that is, satellite 2 merely keeps the NGAP connection with AMF1 activated, returning to the state similar to the initial state of satellite 1 in FIG. 8A.

The scheme of the embodiment three of the present application can avoid the roundabout transfer of the UE NAS context between different anchor point ground station AMFs, thereby reducing related UE handover process signaling and reducing adverse effects such as a user service interruption.

Embodiment Four

In the embodiment four, a local cell set includes merely one cell, that is, one cell is a local cell set; the first mobile node is an LEO satellite loaded with the gNB-DU function;

the peer network node is a gNB CU; and the link connection between the first mobile node and the peer network node is an F1 interface connection.

Figure 9A:
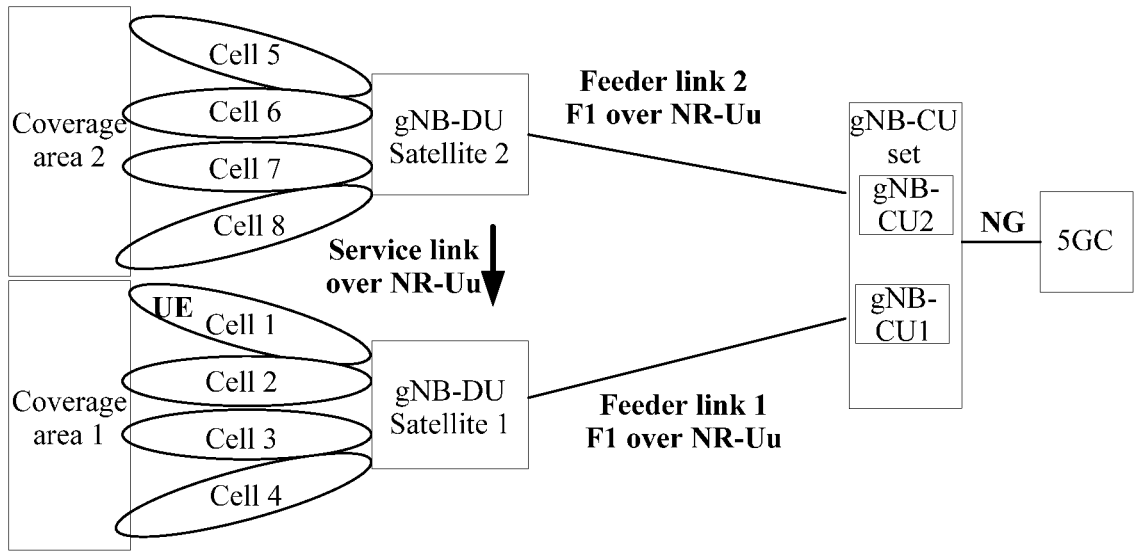
FIG. 9A is a schematic diagram of architecture of a DU-type satellite communication system according to an embodiment four of the present application.

FIG. 9A is a schematic diagram of architecture of a DU-type satellite communication system according to the embodiment four of the present application. As shown in FIG. 9A, in the DU-type satellite communication system, multiple LEO satellites are loaded with the gNB-DU function and travel periodically around the earth in space along the same specific orbit. A terminal UE on the ground (assuming quasi-stationary on the ground and in an RRC-connected state) is currently located in planned ground coverage area 1 under the jurisdiction of gNB-CU1. The current serving cell of the UE is cell 1 under the jurisdiction of satellite 1. The UE directly performs radio communications with space DU-type satellite 1 through the service link, while the LEO satellites respectively set up F1 interface connections with gNB-CUs in the ground station gNB-CU set through feeder links. The F1 interface connections include F1-C signaling F1AP connections and F1-U data connections.

Figure 9B:
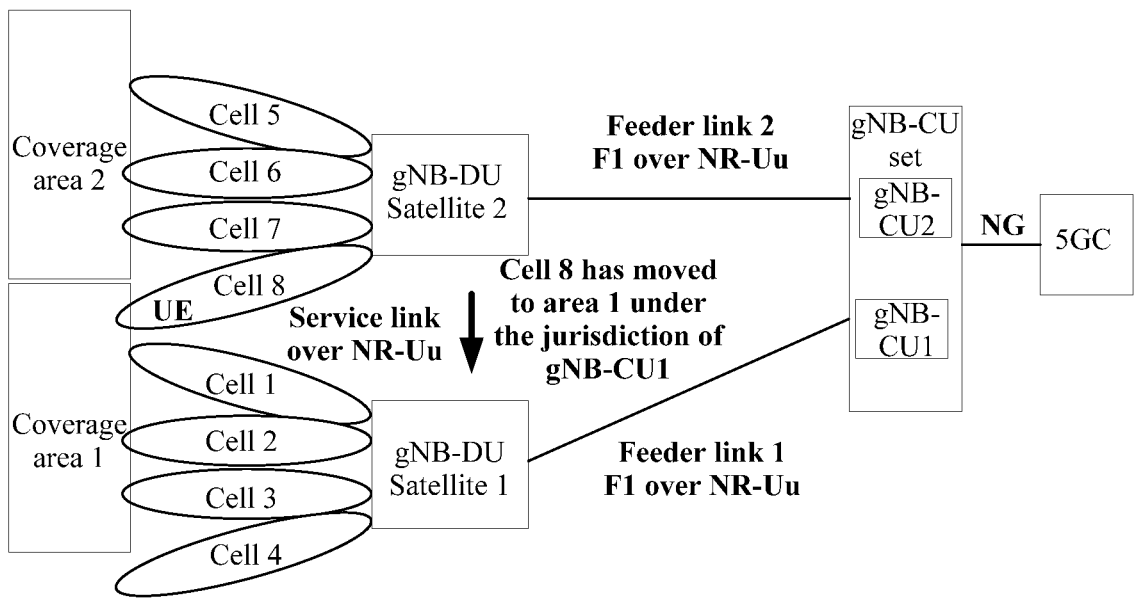
FIG. 9B is a schematic diagram in which a DU-type satellite moves across areas of different ground station gNB-CUs according to the embodiment four of the present application.

Based on the traditional scheme of managing a connection between nodes, in FIG. 9A, satellite 1 is currently connected to ground station gNB-CU1 and satellite 2 is connected to ground station gNB-CU2 (note: in some spatial locations, satellites 1 and 2 may also be connected to the same ground station gNB-CU). As the satellites continue to move downward along the specific orbit, multiple serving cells 8, 7, 6 and 5 under the jurisdiction of satellite 2 gradually leave planned ground coverage area 2 and move into planned ground coverage area 1. As shown in FIG. 9B, cell 8 has moved from the original old coverage area 2 into the new coverage area 1 under the jurisdiction of gNB-CU1. Similarly, cell 4 of satellite 1 below also moves out of the original old coverage area 1 accordingly. According to the requirements of radio link mobility management of a connected-state UE, when the UE monitors that the service signal of the old cell 1 is weaker and weaker, while the service signal of the new cell 8 is stronger and stronger, the UE triggers the network to execute a mobile handover process, and the network attempts to hand over the UE from the old serving cell 1 to the new serving cell 8. The result of successful handover is as follows: on an NG-RAN access network side, the UE AS-DU context is transferred from satellite 1 to satellite 2, and the UE AS-CU context is temporarily transferred from gNB-CU1 to gNB-CU2 (since satellite 2 is always under the jurisdiction of gNB-CU2). After a period of time, when satellite 2 completely moves over the center of coverage area 1 (the current location of satellite 2 is similar to the location of satellite 1 in FIG. 9A), satellite 2 initiates an F1 interface setup process to the new ground station gNB-CU1 while deleting the F1 interface with the old ground station gNB-CU2, so that cells 5, 6, 7 and 8 under the jurisdiction of satellite 2 are used for covering coverage area 1. Due to gNB-CU relocation from the anchor point gNB-CU network element gNB-CU2 to gNB-CU1 of satellite 2, although satellite 2 can continue to retain the UE AS-DU context at this time, the UE AS-CU context still needs to be retransferred from gNB-CU2 back to gNB-CU1, resulting in roundabout transfer of the UE AS-CU Context between different ground station gNB-CUs.

For this, a new scheme of managing a connection between nodes is provided in embodiment four of the present application. The scheme includes steps described below.

Initially, each satellite, for example, satellite 2, sets up F1AP connections in advance respectively with multiple different ground station gNB-CUs, gNB-CU1 and gNB-CU2, and synchronously interacts with the multiple different ground station gNB-CUs through F1 setup processes about respective capability configuration information of the local serving cell and the like. The capability configuration information of the local serving cell includes information about an association between the current local serving cell coverage and different planned ground coverage areas. In the case where satellite 2 is completely over the center of planned ground coverage area 2, cells 5, 6, 7 and 8 are all merely associated with the coverage area 2 and thus are all under the jurisdiction of gNB-CU2, so satellite 2 can merely keep the F1AP connection with the anchor point gNB-CU2 activated, and the F1AP connection with gNB-CU1 can be temporarily deactivated.

Figure 9C:
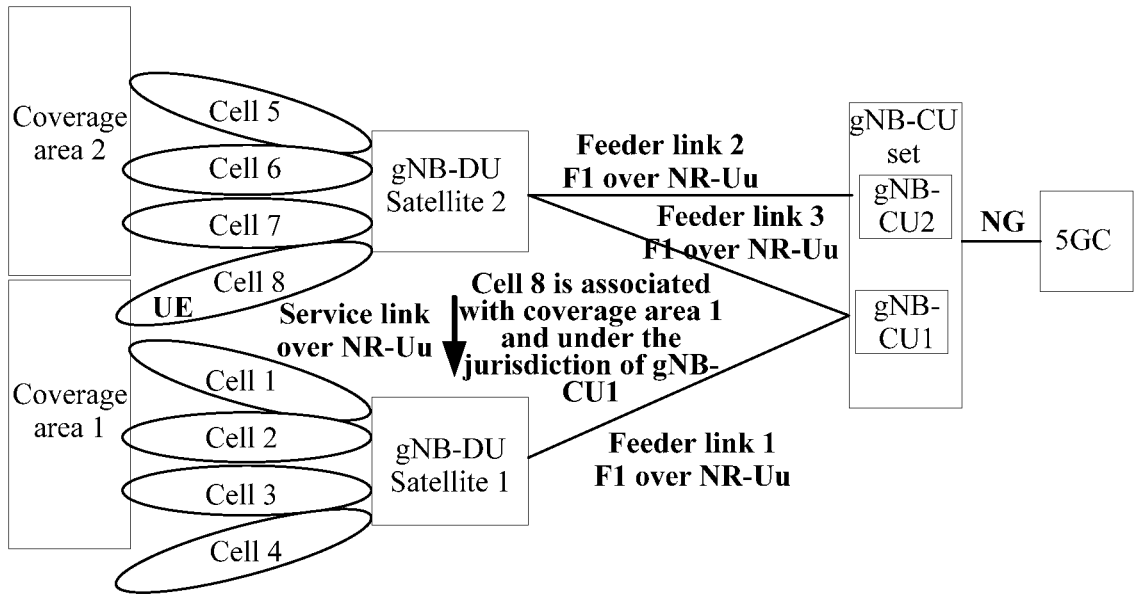
FIG. 9C is a schematic diagram of multiple connections between a DU-type satellite and multiple ground station gNB-CUs according to the embodiment four of the present application.

As shown in FIG. 9C, when satellite 2 enters a boundary area across different ground station gNB-CUs, the F1AP connection between satellite 2 and gNB-CU1 can be reactivated. At this time, satellite 2 informs gNB-CU2 through a gNB-DU configuration update process that cell 8 has left coverage area 2 and the remaining cells 5, 6, and 7 are still in coverage area 2; meanwhile, satellite 2 also informs gNB-CU1 through a gNB-DU configuration update process that cell 8 has entered coverage area 1. Similarly, satellite 1 informs AMF1 through a gNB-DU configuration update process that cell 4 has left coverage area 1 and the remaining cells 1, 2 and 3 are still in coverage area 1. Through the above process, gNB-CU1 can know that cell 8 has entered coverage area 1 under the jurisdiction of gNB-CU1 itself and can be under the jurisdiction of gNB-CU1 itself. Therefore, when the UE triggers a mobile handover process in the old serving cell 1, merely the UE AS-DU context needs to be transferred from satellite 1 to satellite 2 on the NG-RAN access network side, the UE AS-CU context does not need to be transferred from gNB-CU1 to gNB-CU2, that is, the UE AS-CU context continues to be kept in gNB-CU1.

In addition, since cell 8 leaves coverage area 2 and enters coverage area 1, which is a continuous and gradual process, a period of transition time exists during which cell 8 spans both coverage area 2 and coverage area 1. Therefore, cell 8 may also be associated with the two coverage areas 1 and 2 simultaneously and may be under the concurrent jurisdiction of and used by gNB-CU1 and gNB-CU2 simultaneously.

As satellite 2 continues to move downward along the orbit, cells 7, 6 and 5 gradually leave coverage area 2 and enter coverage area 1, and satellite 2 continues to inform gNB-CU2 through the gNB-DU configuration update process of the information about a re-association between a latest local serving cell and coverage area 2; at the same time, satellite 1 continues to inform gNB-CU1 through the gNB-DU configuration update process of the information about a re-association between a latest local serving cell and coverage area 1. Therefore, even when the UE triggers the mobile handover process again in the old serving cell, the UE AS-DU context can always be saved in satellite 2 on the NG-RAN access network side, and the UE AS-CU context can always be kept in gNB-CU1.

Thus, as long as the UE is stationary in coverage area 1 under the jurisdiction of gNB-CU1, although the UE AS-DU context is transferred between different serving satellites due to the handover of serving cells, the UE AS-CU context can always be kept in gNB-CU1, thus avoiding the relocation detour of the gNB-CU anchor point caused by the continuous handover of serving satellites.

As shown in FIG. 9C, as satellite 2 continues to move downward along the orbit, the uppermost cell 5 also leaves coverage area 2 and enters coverage area 1. At this time, satellite 2 is basically over the center of coverage area 1, and cells 5, 6, 7 and 8 are all associated merely with coverage area 1 and thus may all be under the jurisdiction of gNB-CU1. At this time, satellite 2 may also initiate the deactivation of the F1AP connection to gNB-CU2 through the gNB-DU configuration update process, that is, satellite 2 merely keeps the F1AP connection with gNB-CU1 activated, returning to the state similar to the initial state of satellite 1 in FIG. 9A.

The scheme of the embodiment four can avoid the roundabout transfer of the UE AS-CU context between different anchor point ground station gNB-CUs, thereby reducing related UE handover process signaling and reducing adverse effects such as a user service interruption.

Embodiment Five

In the embodiment five, the local cell set includes merely one cell, that is, one cell is a local cell set; the first mobile node is an unmanned aerial vehicle base station loaded with the full gNB function; the peer network node is an access mobility function (AMF) node; and the link connection between the first mobile node and the peer network node is an NG interface connection.

Figure 10A:
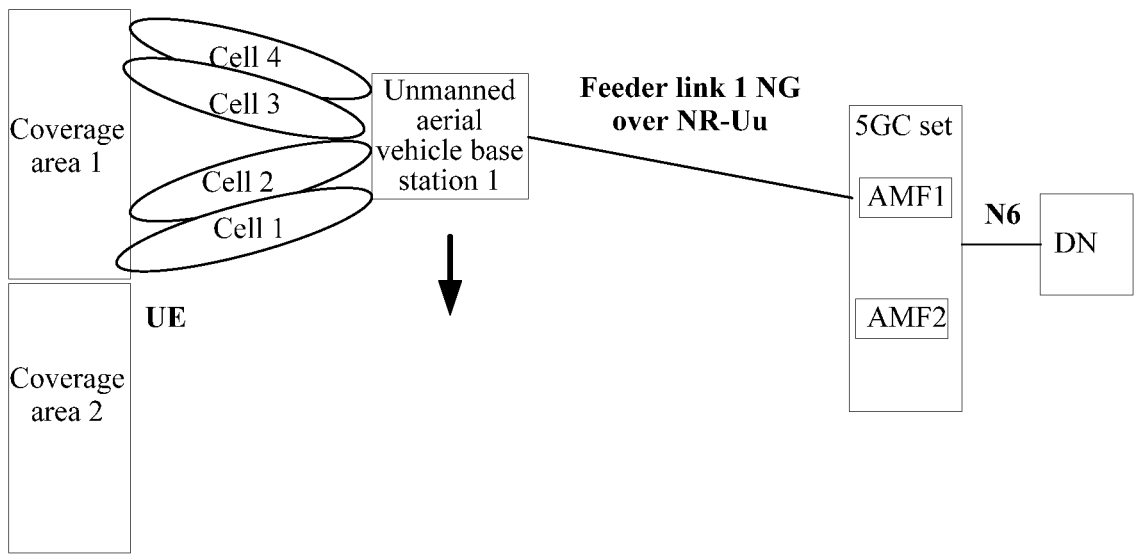
FIG. 10A is a schematic diagram of architecture of an air unmanned aerial vehicle base station communication system according to an embodiment five of the present application.

FIG. 10A is a schematic diagram of architecture of an air unmanned aerial vehicle base station communication system according to the embodiment five of the present application. As shown in FIG. 10A, in the air unmanned aerial vehicle base station communication system, unmanned aerial vehicle base station 1 is loaded with the full gNB function and moves and runs along a random trajectory in the sky. Unmanned aerial vehicle base station 1 sets up the NG interface connection with an AMF/SMF/UPF in the ground station 5GC set through a feeder link. The NG interface connection includes the NG-C signaling NGAP connection and the NG-U data connection. In FIG. 10A, four local serving cells 1, 2, 3 and 4 of unmanned aerial vehicle base station 1 cover planned ground coverage area 1, and a quasi-stationary terminal UE (in an RRC idle state) is located in planned ground coverage area 2 and thus temporarily cannot be subjected to paging by unmanned aerial vehicle base station 1 and cannot directly communicate with unmanned aerial vehicle base station 1. (In addition, the UE may also be simultaneously served by other unmanned aerial vehicle base stations, which is not shown in FIG. 10A).

Figure 10B:
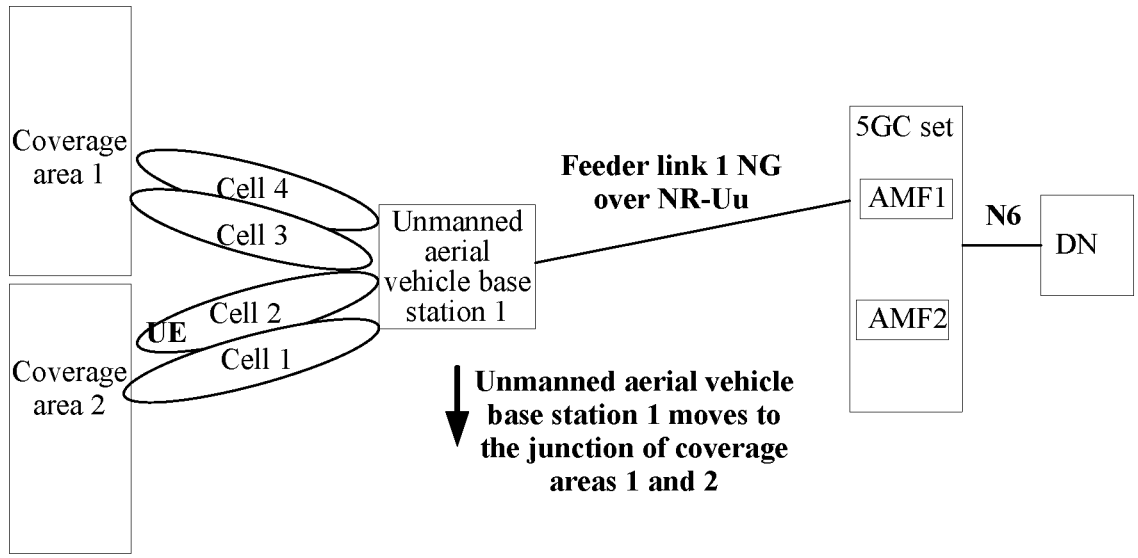
FIG. 10B is a schematic diagram in which an unmanned aerial vehicle base station moves across areas of different ground station AMFs according to the embodiment five of the present application.

Based on the traditional scheme of managing a connection between nodes, in FIG. 10A, unmanned aerial vehicle base station 1 is currently connected to the anchor point ground station AMF1. As the unmanned aerial vehicle base station moves downward randomly, multiple serving cells 1, 2, 3 and 4 under the jurisdiction of unmanned aerial vehicle base station 1 gradually leave planned ground coverage area 1 and move into planned ground coverage area 2. As shown in FIG. 10B, cells 1 and 2 have moved from the old coverage area 1 into the new coverage area 2 under the jurisdiction of AMF2. According to the requirements of paging management of an idle-state UE, AMF2 needs to know which unmanned aerial vehicle base stations and local serving cells thereof can currently serve the UE within coverage area 2. Otherwise, AMF2 cannot find a suitable unmanned aerial vehicle base station to undertake an air interface paging task in the case where the UE has downlink signaling/data arrived and thus triggers AMF2 to perform NG interface paging. Therefore, when unmanned aerial vehicle base station 1 moves into a new coverage area, a re-association between the local serving cell coverage and the coverage area needs to be performed in time and updated and reported to the AMF to synchronize available end-to-end radio network links.

For this, a new scheme of managing a connection between nodes is provided in embodiment five of the present application. The scheme includes steps described below.

Initially, each unmanned aerial vehicle base station, for example, unmanned aerial vehicle base station 1, sets up NGAP connections in advance respectively with multiple different ground station AMFs, AMF1 and AMF2, and synchronously interacts with the multiple different AMFs through NG setup processes about respective capability configuration information of the local serving cell and the like. The capability configuration information of the local serving cell includes information about an association between the current local serving cell coverage and different planned ground coverage areas. In the case where unmanned aerial vehicle base station 1 is completely over the center of planned ground coverage area 1, cells 1, 2, 3 and 4 are all merely associated with planned ground coverage area 1 and thus are all under the jurisdiction of AMF1, so unmanned aerial vehicle base station 1 can merely keep the NGAP connection with the anchor point AMF1 activated, and the NGAP connection with AMF2 can be temporarily deactivated.

Figure 10C:
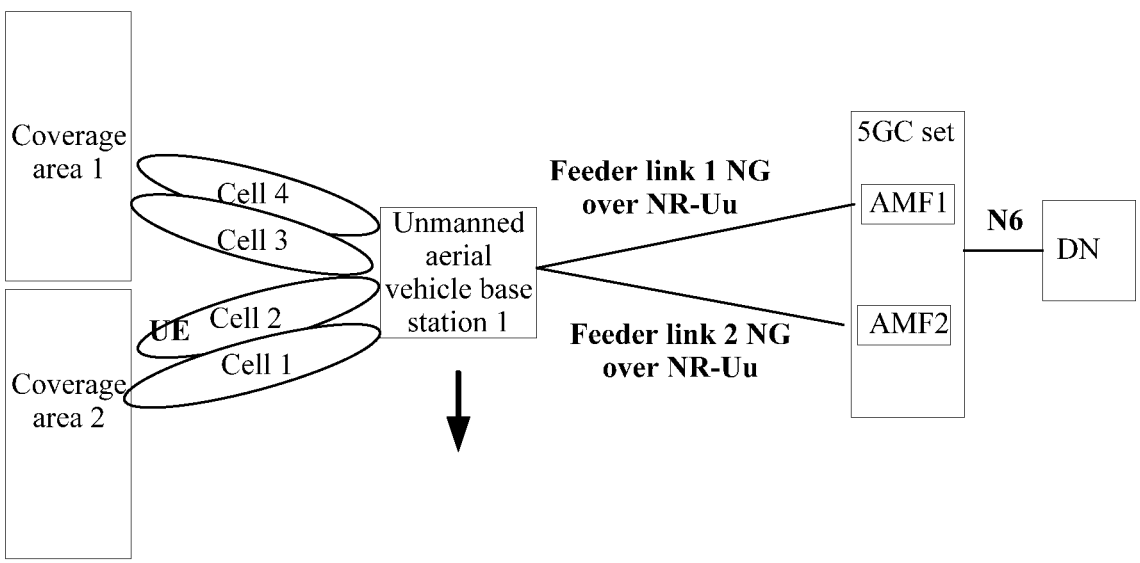
FIG. 10C is a schematic diagram of multiple connections between an unmanned aerial vehicle base station and multiple ground station AMFs according to the embodiment five of the present application.

As shown in FIG. 10C, in the case where unmanned aerial vehicle base station 1 enters a boundary area across different ground station AMFs, the NGAP connection between unmanned aerial vehicle base station 1 and AMF2 may be reactivated. At this time, unmanned aerial vehicle base station 1 informs AMF1 through an RAN configuration update process that cells 1 and 2 have left coverage area 1 and the remaining cells 3 and 4 are still in coverage area 1; at the same time, unmanned aerial vehicle base station 1 also informs AMF2 through an RAN configuration update process that cells 1 and 2 have entered coverage area 2. Through the above process, AMF2 may know that cells 1 and 2 have entered coverage area 2 under the jurisdiction of AMF2 itself and thus can be under the jurisdiction of and used by AMF2 itself. Therefore, when the UE has downlink signaling/data arrived and thus triggers AMF2 to perform NG interface paging, AMF2 can use unmanned aerial vehicle base station 1 to undertake the air interface paging task.

In addition, since cells 1 and 2 leave coverage area 1 and enter coverage area 2, which is a continuous and gradual process, a period of transition time exists during which cell 1 spans both coverage area 1 and coverage area 2 and a period of transition time exists during which cell 2 spans both coverage area 1 and coverage area 2. Therefore, cells 1 and 2 each may also be associated with the two coverage areas 1 and 2 simultaneously and may be under the concurrent jurisdiction of and used by AMF1 and AMF2 simultaneously.

As unmanned aerial vehicle base station 1 continues to move randomly, the local serving cells 1, 2, 3 and 4 continue to re-associate with the coverage areas 1 and 2, and unmanned aerial vehicle base station 1 continues to inform AMF1 through the RAN configuration update process of information about a re-association between a latest local serving cell and coverage area 1; at the same time, unmanned aerial vehicle base station 1 continues to inform AMF2 through the RAN configuration update process of information about a re-association between a latest local serving cell and coverage area 2.

As shown in FIG. 10C, it is assumed that unmanned aerial vehicle base station 1 continues to move downward. When local serving cells 1, 2, 3 and 4 all leave coverage area 1 and enter coverage area 2, unmanned aerial vehicle base station 1 is basically over the center of coverage area 2, and cells 1, 2, 3 and 4 are all associated merely with coverage area 2 and thus may all be under the jurisdiction of AMF2. At this time, unmanned aerial vehicle base station 1 may also initiate the deactivation of the NGAP connection to AMF1 through the RAN configuration update process, that is, unmanned aerial vehicle base station 1 merely keeps the NGAP connection with AMF2 activated, returning to the state similar to the initial state of unmanned aerial vehicle base station 1 in FIG. 10A.

The technical scheme provided in the embodiment five can prevent AMF2 from failing to identify an available unmanned aerial vehicle base station and local serving cells thereof in the current area under the jurisdiction of AMF2 in time and thus avoid losing the opportunity of serving the UE in the coverage area under the jurisdiction of AMF2, thereby improving the utilization rate of resources of the unmanned aerial vehicle base station and the served experience of the UE.

The connections in embodiments three, four and five can be deleted when a preset condition is met, that is, the old connection configuration and corresponding port resources are deleted by two peer nodes of the communication. The preset condition may be that an old connection has been in a deactivated state for more than a preset time limit, the difference between a location of a serving cell of a mobile node at one end of the old connection and an edge location of a coverage tracking area range of a network node at the other end of the old connection exceeds a preset threshold, and the like.

Embodiment Six

Figure 11:
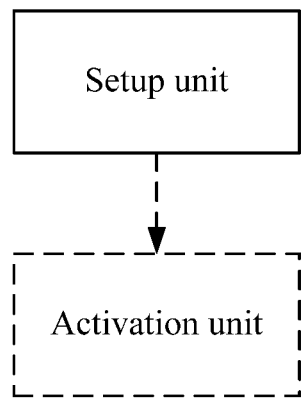
FIG. 11 is a structure diagram of a first mobile node according to an embodiment six of the present application.

FIG. 11 is a structure diagram of a first mobile node according to the embodiment six of the present application. As shown in FIG. 11, the first mobile node includes a setup unit.

The setup unit is configured to set up link connections with multiple peer network nodes separately through a network interface setup process.

In an embodiment, the link connections include at least one of: control plane signaling connections or user plane data connections.

In an embodiment, the setup unit includes a division unit and an initiation and interaction unit.

The division unit is configured to divide multiple local serving cells subordinate to the first mobile node into multiple local cell sets.

The initiation and interaction unit is configured to enable each local cell set to initiate, over a corresponding network interface, setup processes of link connections with at least two of the multiple peer network nodes and interact with the at least two of the multiple peer network nodes about respective configuration information.

In an embodiment, the configuration information includes at least one of: a local capability of a local cell set, resource configuration of a local cell set or radio coverage related information of a local cell set.

In an embodiment, after the setup of the setup process and the interaction about the respective configuration information, a different local cell set among the multiple local cell sets is under a jurisdiction of a different peer network node; or the same local cell set among the multiple local cell sets is under a jurisdiction of different peer network nodes simultaneously.

In an embodiment, in a case where all local cell sets subordinate to the first mobile node are completely within a second coverage tracking area range under a jurisdiction of a second peer network node among the multiple peer network nodes, a second link connection between the first mobile node and the second peer network node is in an activated state, other link connections between the first mobile node and other peer network nodes among the multiple peer network nodes except the second peer network node are in a deactivated state, and the first mobile node is under the jurisdiction of the second peer network node.

In an embodiment, as shown in FIG. 11, the first mobile node further includes an activation unit.

The activation unit is configured to: after the first mobile node is under the jurisdiction of the second peer network node and in a case where at least one local cell set subordinate to the first mobile node is within a first coverage tracking area range under a jurisdiction of the first peer network node among the multiple peer network nodes, activate the first link connection that has been set up between the first mobile node and the first peer network node, where the first mobile node and the at least one local cell set subordinate to the first mobile node are under a concurrent jurisdiction of the second peer network node and the first peer network node simultaneously.

In an embodiment, the step of activating the first link connection that has been set up between the first mobile node and the first peer network node includes the step described below.

A transport network layer (TNL) link association is initiated, a node configuration update process is initiated to the first peer network node, and the first peer network node is notified through the first link connection that has been set up with the first peer network node that the at least one local cell set is within the first coverage tracking area range and of information about the local cell set subordinate to the first mobile node.

In an embodiment, the activation unit is further configured to initiate a node configuration update process to the second peer network node and notify, through the second link connection that has been set up with the second peer network node, the second peer network node that the at least one local cell set is out of the second coverage tracking area range and of information about local cell sets subordinate to the first mobile node except the at least one local cell set.

In an embodiment, the activation unit is further configured to: after the first mobile node is under the concurrent jurisdiction of the second peer network node and the first peer network node simultaneously and in a case where all the local cell sets subordinate to the first mobile node are out of the second coverage tracking area range, temporarily turn off the TNL link association, and deactivate the second link connection, the first mobile node and all the local cell sets subordinate to the first mobile node are merely under the jurisdiction of the first peer network node.

In an embodiment, the step of deactivating the second link connection includes the step described below.

A node configuration update process is initiated to the second peer network node, and the second peer network node is notified through the second link connection that has been set up with the second peer network node that all local cell sets subordinate to the first mobile node are out of the second coverage tracking area range, but the second peer network node still keeps configuration context information of an interface link connection for the first mobile node to activate the TNL link association again.

In an embodiment, the first mobile node further includes a transfer unit.

The transfer unit is configured to: in a case where a first UE triggers a mobile handover process for handover from a first local cell set subordinate to the first mobile node to a second local cell set subordinate to a second mobile node, and the first local cell set and the second local cell set are both within a first coverage tracking area range under a jurisdiction of a first peer network node among the multiple peer network nodes, merely transfer UE AS context of the first UE from the first mobile node to the second mobile node, and always keep and maintain UE NAS context in the first peer network node.

In an embodiment, the first mobile node further includes a saving unit.

The saving unit is configured to: in a case where a first UE stays in a first coverage tracking area range under a jurisdiction of a first peer network node, always save UE NAS context of the first UE. Only when the first UE moves outside the first coverage tracking area range under the jurisdiction of the first peer network node, a target peer network node saves the migrated UE NAS context.

In an embodiment, the mobile node is a mobile NG-RAN base station, the peer network nodes are 5GC network nodes, and the link connections are NGAP connection instances.

Alternatively, the mobile node is a mobile NG-RAN base station, the peer network nodes are mobile NG-RAN base stations, and the link connections are XnAP connection instances.

Alternatively, the mobile node is a distributed unit (DU), the peer network nodes are centralized units (CUs), and the link connections are F1AP connection instances.

In an embodiment, the 5GC network node is one of: an access mobility function (AMF) node, a session management function (SMF) node or a user plane function (UPF) node.

The mobile NG-RAN base station is one of: an ng-eNB evolved based on the 4G eNB, a gNB designed with a brand new physical layer air interface, a low earth orbit (LEO) satellite loaded with the full gNB function or an unmanned aerial vehicle base station loaded with the full gNB function.

A CU in the mobile NG-RAN base station is a gNB-CU of a disaggregated NG-RAN base station.

A DU in the mobile NG-RAN base station is one of: a gNB-DU of the disaggregated NG-RAN base station or an LEO satellite loaded with the gNB-DU function.

Embodiment Seven

Figure 12:
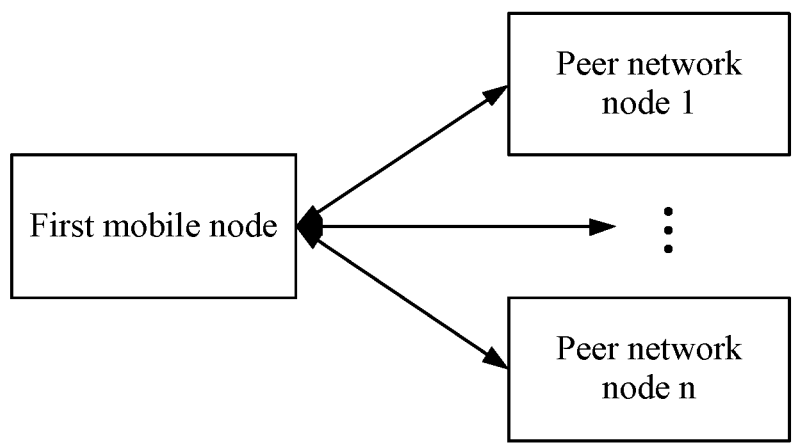
FIG. 12 is a structure diagram of a system for managing a link connection between nodes according to an embodiment seven of the present application.

FIG. 12 is a structure diagram of a system for managing a link connection between nodes according to the embodiment seven of the present application. As shown in FIG. 12, the system includes a first mobile node and multiple peer network nodes.

The first mobile node is configured to set up link connections with the multiple peer network nodes separately through a network interface setup process.

In an embodiment, the link connections include at least one of: control plane signaling connections or user plane data connections.

In an embodiment, the step in which the first mobile node sets up the link connections with the multiple peer network nodes separately through the network interface setup process includes steps described below.

The first mobile node divides multiple local serving cells subordinate to the first mobile node into multiple local cell sets.

Each local cell set initiates, over a corresponding network interface, setup processes of link connections with at least two of the multiple peer network nodes and interacts with the at least two of the multiple peer network nodes about respective configuration information.

In an embodiment, the configuration information includes at least one of: a local capability of a local cell set, resource configuration of a local cell set or radio coverage related information of a local cell set.

In an embodiment, after the setup of the setup process and the interaction about the respective configuration information, the method further includes a step described below.

A different local cell set among the multiple local cell sets is under the jurisdiction of a different peer network node.

Alternatively, the same local cell set among the multiple local cell sets is under a jurisdiction of different peer network nodes simultaneously.

In an embodiment, in a case where all local cell sets subordinate to the first mobile node are completely within a second coverage tracking area range under a jurisdiction of a second peer network node among the multiple peer network nodes, a second link connection between the first mobile node and the second peer network node is in an activated state, other link connections between the first mobile node and other peer network nodes among the multiple peer network nodes except the second peer network node are in a deactivated state, and the first mobile node is under the jurisdiction of the second peer network node.

In an embodiment, after the first mobile node is under the jurisdiction of the second peer network node and in a case where at least one local cell set subordinate to the first mobile node is within a first coverage tracking area range under a jurisdiction of the first peer network node among the multiple peer network nodes, the first mobile node is further configured to activate the first link connection that has been set up between the first mobile node and the first peer network node, where the first mobile node and the at least one local cell set subordinate to the first mobile node are under a concurrent jurisdiction of the second peer network node and the first peer network node simultaneously.

In an embodiment, the step of activating the first link connection that has been set up between the first mobile node and the first peer network node includes the step described below.

A transport network layer (TNL) link association is initiated, a node configuration update process is initiated to the first peer network node, and the first peer network node is notified through the first link connection that has been set up with the first peer network node that the at least one local cell set has been within the first coverage tracking area range and of information about the local cell set subordinate to the first mobile node.

In an embodiment, the first mobile node is further configured to initiate a node configuration update process to the second peer network node and notify, through the second link connection that has been set up with the second peer network node, the second peer network node that the at least one local cell set has been out of the second coverage tracking area range and of information about local cell sets subordinate to the first mobile node except the at least one local cell set.

In an embodiment, after the first mobile node is under the jurisdiction of the second peer network node and the first peer network node simultaneously and in a case where all the local cell sets subordinate to the first mobile node are out of the second coverage tracking area range, the first mobile node is further configured to temporarily turn off the TNL link association and deactivate the second link connection, the first mobile node and all local cell sets subordinate to the first mobile node are merely under the jurisdiction of the first peer network node.

In an embodiment, the step of deactivating the second link connection includes the step described below.

A node configuration update process is initiated to the second peer network node, and the second peer network node is notified through the second link connection that has been set up with the second peer network node that all the local cell sets subordinate to the first mobile node are out of the second coverage tracking area range, the second peer network node still keeps configuration context information of an interface link connection for the first mobile node to activate the TNL link association again.

In an embodiment, the system further includes a second mobile node.

In a case where a first UE triggers a mobile handover process for handover from a first local cell set subordinate to the first mobile node to a second local cell set subordinate to a second mobile node, and the first local cell set and the second local cell set are both within a first coverage tracking area range under a jurisdiction of a first peer network node among the multiple peer network nodes, the first mobile node is further configured to merely transfer UE AS context of the UE from the first mobile node to the second mobile node and always keep and maintain UE NAS context in the first peer network node.

In an embodiment, the first mobile node is further configured to: in a case where a first UE stays in a first coverage tracking area range under a jurisdiction of a first peer network node, always save UE NAS context of the first UE. Only when the first UE moves outside the first coverage tracking area range under the jurisdiction of the first peer network node, a target peer network node saves the migrated UE NAS context.

In an embodiment, the mobile node is a mobile NG-RAN base station, the peer network nodes are 5GC network nodes, and the link connections are NGAP connection instances.

Alternatively, the mobile node is a mobile NG-RAN base station, the peer network nodes are mobile NG-RAN base stations, and the link connections are XnAP connection instances.

Alternatively, the mobile node is a distributed unit (DU), the peer network nodes are centralized units (CUs), and the link connections are F1AP connection instances.

In an embodiment, the 5GC network node is one of: an access mobility function (AMF) node, a session management function (SMF) node or a user plane function (UPF) node.

The mobile NG-RAN base station is one of: an ng-eNB evolved based on the 4G eNB, a gNB designed with a brand new physical layer air interface, a low earth orbit (LEO) satellite loaded with a Full gNB function or an unmanned aerial vehicle base station loaded with a Full gNB function.

A CU in the mobile NG-RAN base station is a gNB-CU of a disaggregated NG-RAN base station.

A DU in the mobile NG-RAN base station is one of: a gNB-DU of the disaggregated NG-RAN base station or an LEO satellite loaded with the gNB-DU function.

The embodiments of the present application further provide a first mobile node. The first mobile node includes a memory, a processor and a computer program stored in the memory and executable on the processor. When the computer program is executed by the processor, any preceding method for managing a link connection between nodes is performed.

The embodiments of the present application further provide a computer-readable storage medium storing an information processing program. When the information processing program is executed by a processor, any preceding method for managing the link connection between nodes is performed.

According to the technical scheme provided in the embodiments of the present application, a method of managing multiple interface connections of a mobile base station is implemented, so that in the network environment constructed by the mobile base station, the TNL transmission bearer and the upper layer RNL application protocol layer connection between a mobile network element node (serving cell) and a peer network element node can be efficiently set up and maintained. Thus, it is ensured as much as possible that the interfaces of the network such as NG, F1 and Xn can match and adapt to the dynamic topology of the mobile base station in time, the unnecessary TNL/RNL layer interface reconstruction and interface service interruption of the interfaces such as NG, F1 and Xn is minimized, and the utilization rate of the resources of the mobile base station by the system is improved.

It is to be understood by those of ordinary skill in the art that all or some of the steps and systems in the methods disclosed herein and all or some of the functional modules/units in the apparatuses disclosed herein may be implemented as software, firmware, hardware or a suitable combination thereof. In the hardware implementation, the division of the function modules/units in the preceding description may not correspond to the division of physical components. For example, one physical component may have several functions, or one function or step may be executed jointly by several physical components. Some or all of the components may be implemented as software executed by a processor such as a digital signal processor or a microprocessor, may be implemented as hardware, or may be implemented as an integrated circuit such as an application-specific integrated circuit. Such software may be distributed over computer-readable media. The computer-readable media may include computer storage media (or non-transitory media) and communication media (or transitory media). As is known to those of ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a random access memory (RAM), a read-only memory (ROM), an electrically erasable programmable read only memory (EEPROM), a flash memory or another memory technology, a compact disc read-only memory (CD-ROM), a digital video disc (DVD) or another optical disc storage, a magnetic cassette, a magnetic tape, disk storage or another magnetic storage apparatus, or any other medium used to store the desired information and accessible by a computer. Moreover, it is known to those of ordinary skill in the art that communication media typically include computer-readable instructions, data structures, program modules or other data in modulated data signals such as carrier waves or other transport mechanisms and may include any information delivery medium.

What is claimed is:

1. A method for managing a link connection between nodes, comprising:
    setting up, by a first mobile node, link connections with a plurality of peer network nodes separately through a network interface setup process;
    wherein setting up, by the first mobile node, the link connections with the plurality of peer network nodes separately through the network interface setup process comprises:
    dividing, by the first mobile node, a plurality of local serving cells belonging to the first mobile node into a plurality of local serving cell sets according to management attributes of the plurality of local serving cells, wherein each local serving cell set of the plurality of local serving cell sets comprises at least one local serving cell of the plurality of local serving cells, each local serving cell set of the plurality of local serving cell sets sets up a link connection with each peer network node of the plurality of peer network nodes independently, local serving cells within the same local serving cell set of the plurality of local serving cell sets have the same management attribute, and different local serving cell sets of the plurality of local serving cell sets have different management attributes; and
    initiating, by the first mobile node, setup processes of link connections with at least two of the plurality of peer network nodes over a network interface of each local serving cell set of the plurality of local serving cell sets, and exchanging configuration information with the at least two of the plurality of peer network nodes;
    wherein different local serving cell sets of the plurality of local serving cell sets are associated with to different network interfaces; and
    wherein each local serving cell set of the plurality of local serving cell sets is associated with to at least two peer network nodes, and peer network nodes associated by different local serving cell sets of the plurality of local serving cell sets are not the same.

2. The method of claim 1, wherein the link connections comprise at least one of: control plane signaling connections or user plane data connections.

3. The method of claim 1, wherein the configuration information comprises at least one of: a local capability of a local serving cell set, resource configuration of a local serving cell set or radio coverage related information of a local serving cell set.

4. The method of claim 1, wherein each local serving cell set of the plurality of local serving cell sets is managed by a respective peer network node of the plurality of peer network nodes, and each local serving cell set of the plurality of local serving cell sets is within a coverage tracking area range of the respective peer network node of the plurality of peer network nodes; or
    each local serving cell set of the plurality of local serving cell sets is managed by more than one peer network node of the plurality of peer network nodes, and each local serving cell set of the plurality of local serving cell sets is within a coverage tracking area range of each of the more than one peer network node of the plurality of peer network nodes simultaneously.

5. The method of claim 1, wherein the at least two of the plurality of peer network nodes comprise a first peer network node and a second peer network node, a first link connection with the first peer network node and a second link connection with the second peer network node have been set up by the first mobile node, in a case where all of the plurality of local serving cell sets belonging to the first mobile node are within a second coverage tracking area range of the second peer network node, the second link connection between the first mobile node and the second peer network node is in an activated state, the first link connection between the first mobile node and the first peer network node is in a deactivated state, the plurality of local serving cell sets are managed by the second peer network node, and the first mobile node is managed by the second peer network node.

6. The method of claim 5, wherein after the first mobile node is managed by the second peer network node, the method further comprises:
    in a case where at least one local serving cell set belonging to the first mobile node is within a first coverage tracking area range of the first peer network node among the plurality of peer network nodes, activating the first link connection that has been set up between the first mobile node and the first peer network node;
    wherein the first mobile node and the at least one local serving cell set belonging to the first mobile node are managed by the second peer network node and the first peer network node simultaneously.

7. The method of claim 6, wherein activating the first link connection that has been set up between the first mobile node and the first peer network node comprises:
    initiating, by the first mobile node, a transport network layer (TNL) link association, initiating a node configuration update process to the first peer network node, and notifying, through the first link connection that has been set up with the first peer network node, the first peer network node of information about the at least one local serving cell set belonging to the first mobile node and the at least one local serving cell set being within the first coverage tracking area range.

8. The method of claim 7, further comprising:
    initiating, by the first mobile node, a node configuration update process to the second peer network node, and notifying, through the second link connection that has been set up with the second peer network node, the second peer network node of the at least one local serving cell set being out of the second coverage tracking area range and information about local serving cell sets belonging to the first mobile node except the at least one local serving cell set.

9. The method of claim 6, wherein after the first mobile node is managed by the second peer network node and the first peer network node simultaneously, the method further comprises:
    in a case where all of the plurality of local serving cell sets belonging to the first mobile node are out of the second coverage tracking area range, turning off a transport network layer (TNL) link association temporarily, and deactivating the second link connection;
    wherein the first mobile node and all of the plurality of local serving cell sets belonging to the first mobile node are merely managed by the first peer network node.

10. The method of claim 9, wherein deactivating the second link connection comprises:
    initiating, by the first mobile node, a node configuration update process to the second peer network node, and notifying, through the second link connection that has been set up with the second peer network node, the second peer network node that all of the plurality of local serving cell sets belonging to the first mobile node are out of the second coverage tracking area range, wherein the second peer network node still keeps configuration context information of an interface link connection for the first mobile node to initiate the TNL link association again.

11. The method of claim 1, further comprising:
in a case where a first user equipment (UE) triggers a mobile handover process for handover from a first local serving cell set belonging to the first mobile node to a second local serving cell set belonging to a second mobile node, and the first local serving cell set and the second local serving cell set are both within a first coverage tracking area range managed by a first peer network node among the plurality of peer network nodes, transferring merely UE access stratum (AS) context of the first UE from the first mobile node to the second mobile node, and always keeping and maintaining UE non-access stratum (NAS) context of the first UE in the first peer network node.

12. The method of claim 1, further comprising:
in a case where a first UE stays in a first coverage tracking area range of a first peer network node, always saving, by the first peer network node, UE NAS context of the first UE; and only in a case where the first UE moves outside the first coverage tracking area range of the first peer network node, saving, by a target peer network node, the UE NAS context.

13. The method of claim 11, wherein
each of the first mobile node and the second mobile node is a mobile next generation radio access network (NG-RAN) base station, the plurality of peer network nodes are fifth-generation core (5GC) network nodes, and the link connections are next generation application protocol (NGAP) connection instances; or
each of the first mobile node and the second mobile node is a mobile NG-RAN base station, the plurality of peer network nodes are mobile NG-RAN base stations, and the link connections are Xn application protocol (XnAP) connection instances; or
each of the first mobile node and the second mobile node is a distributed unit (DU), the plurality of peer network nodes are centralized units (CUs), and the link connections are F1 application protocol (F1AP) connection instances.

14. The method of claim 13, wherein each of the 5GC network nodes is one of: an access mobility function (AMF) node, a session management function (SMF) node or a user plane function (UPF) node;
each of the mobile NG-RAN base stations is one of: an ng-evolved nodes B (eNB) evolved based on a 4G eNB, a gNB designed with a brand new physical layer air interface, a low earth orbit (LEO) satellite loaded with a full gNB function or an unmanned aerial vehicle base stations loaded with a full gNB function;
a centralized unit (CU) in a mobile NG-RAN base station is a gNB-CU of a disaggregated NG-RAN base station; and
a distributed unit (DU) in a mobile NG-RAN base station is one of: a gNB-DU of the disaggregated NG-RAN base station or an LEO satellite loaded with a gNB-DU function.

15. A first mobile node, comprising:
a setup unit, which is configured to set up link connections with a plurality of peer network nodes separately through a network interface setup process;
wherein the setup unit comprises:
a division unit, which is configured to divide the plurality of local serving cells belonging to the first mobile node into a plurality of local serving cell sets according to management attributes of the plurality of local serving cells, wherein each local serving cell set of the plurality of local serving cell sets comprises at least one local serving cell of the plurality of local serving cells, each local serving cell set of the plurality of local serving cell sets sets up a link connection with each peer network node of the plurality of peer network nodes independently, local serving cells within the same local serving cell set of the plurality of local serving cell sets have the same management attribute, and different local serving cell sets of the plurality of local serving cell sets have different management attributes; and
an initiation and interaction unit, which is configured to initiate setup processes of link connections with at least two of the plurality of peer network nodes over a network interface of each local serving cell set of the plurality of local serving cell sets, and exchange configuration information with the at least two of the plurality of peer network nodes;
wherein different local serving cell sets of the plurality of local serving cell sets are associated with to different network interfaces; and
wherein each local serving cell set of the plurality of local serving cell sets is associated with at least two peer network nodes, and peer network nodes associated by different local serving cell sets of the plurality of local serving cell sets are not the same.

16. A system for managing a link connection between nodes, comprising:
a first mobile node and a plurality of peer network nodes;
wherein the first mobile node is configured to perform the method of claim 1.

17. A mobile node, comprising a memory, a processor and a computer program stored in the memory and executable on the processor, wherein when the computer program is executed by the processor, the method for managing the link connection between nodes of claim 1 is performed.

18. A non-transitory computer-readable storage medium, storing an information processing program, wherein when the information processing program is executed by a processor, the method for managing the link connection between nodes of claim 1 is performed.

* * * * *